United States Patent
Kobayashi et al.

(10) Patent No.: US 7,093,130 B1
(45) Date of Patent: Aug. 15, 2006

(54) SYSTEM AND METHOD FOR DELIVERING AND EXAMINING DIGITAL TICKETS

(75) Inventors: Noriya Kobayashi, Okayama (JP); Bennet Yee, Carlsbad, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/490,354

(22) Filed: Jan. 24, 2000

(51) Int. Cl.
*H04L 9/00* (2006.01)

(52) U.S. Cl. ............... 713/176; 713/161; 713/168; 713/181; 705/67; 705/76

(58) Field of Classification Search ........... 713/176; 705/50, 69
See application file for complete search history.

(56) References Cited

U.S. PATENT DOCUMENTS

| | | | |
|---|---|---|---|
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 6,178,409 B1* | 1/2001 | Weber et al. | 705/79 |
| 6,253,193 B1* | 6/2001 | Ginter et al. | 705/57 |
| 6,289,108 B1* | 9/2001 | Rhoads | 382/100 |
| 6,389,402 B1* | 5/2002 | Ginter et al. | 705/51 |
| 6,523,067 B1* | 2/2003 | Mi et al. | 709/229 |
| 6,801,929 B1* | 10/2004 | Donoho et al. | 709/204 |
| 2002/0116616 A1* | 8/2002 | Mi et al. | 713/168 |

OTHER PUBLICATIONS

AIM Standard, Uniform Symbology Specification PDF417, pp. 1-3.

(Continued)

Primary Examiner—Kambiz Zand
(74) Attorney, Agent, or Firm—Greer, Burns & Crain, Ltd.

(57) ABSTRACT

A digital ticket is procured by a client ticket consumer upon, preferably, the Internet from and by staged interaction with a ticket provider server. The digital ticket becomes embodied in a tangible transportable data storage medium, normally a 2-D bar code printed on paper by the consumer, or on the consumer's flexible disk or smart card, containing Sign(s,I||hash(R))||R where (1) R is a number having its origin in the computer of the ticket consumer, which number R is appended to (2) a number Sign(s,I||hash(R)). This number Sign(s,I||hash(R)) was earlier computed in the computer of the ticket provider as a digital signature using signature key s of a number hash(R) combined with event information I, and was subsequently communicated across the communications network to the computer of the ticket consumer. The number hash(R) was itself even earlier computed in the computer of the ticket consumer as a one-way function of random number R, which computed one-way function was subsequently communicated to the computer of the ticket provider. The number R is private to the ticket consumer and not public; the digital signature key s is private to the ticket provider.

The digital ticket is redeemed by (1) transporting the transportable storage medium within which the Sign(s,I||hash(R))||R is written to the particular selected event; (2) tendering the digital ticket for verification and for admission; (3) reading the Sign(s,I||hash(R))||R to an event computer and extracting the number R; (4) decrypting the remaining Sign(s, I||hash(R)) with verification key v of the ticket producer to get hash(R) and I; (5) re-calculating from R, with the same one-way function previously used, a re-calculated hash(R); then, having this recalculated hash(R) to hand; (6) comparing the re-calculated hash(R) to the extracted hash(R). The (4) decrypting will work, producing a proper I for the selected event, and the (6) comparing will be equal, only for a legitimate ticket.

47 Claims, 3 Drawing Sheets

OTHER PUBLICATIONS

Mullender, editor; The Amoeba Distributed Operating System: Selected Papers 1984-1987; Centre for Mathematics and Computer Science, 1987, p. 1.

Okamoto et al., "Universal Electronic Cash," Advances in Cryptology—Crypto, 1991, pp. 324-337; Springer-Verlag, Berlin Heidelberg 1992.

United States Postal Service Specification, Performance Criteria and Security Architecture for Open IBI Postage Evidencing System, USPS-I-3195, pp. 1-84, Feb. 23, 2000.

RSA SecurID Ready Implementation Guide, AXENT Technologies, Inc., pp. 1-7, Sep. 14, 2000.

Fujimura et al., "XML Ticket: Generalized Digital Ticket Definition Language," NTT Information Sharing Platform Laboratories, pp. 1-5.

Brown, R.D., "Digital Signatures for XML," IETF Internet Draft, Jan. 1999, pp. 1-53.

Fujimura et al., "General-purpose Digital Ticket Framework," USENIX, Proceedings of the 3rd USENIX Workshop on Electronic Commerce, Boston, Massachusetts, Aug. 31-Sep. 3, 1998, pp. 1-11.

Fujimura et al, "Digital-Ticket-Controlled Digital Ticket Circulation," USENIX, Proceedings of the 8th USENIX Security Symposium, Washington, D.C., Aug. 23-26, 1999, pp. 1-12.

XML Scheme Requirements, the World Wide Consortium, Note, Feb. 1999 (see http://www.w3.org/TF/NOTE-xml-schema-req), pp. 1-5.

Rivest et al., "A Method for Obtaining Digital Signatures and Public-Key Cryptosystens," MIT Laboratory for Computer Science and Department of Mathematics, pp. 120-126, 1978.

RSA Public Key Encryption System, Text Instructions, retrieved from the web at http://library.wolfram.com/infocenter/mathsource/1966, 1966, one page.

Tygar et al, "Cryptographic Postage Indicia," In Concurrency and Parallelism, Programming, Networking, and Security, eds. J. Jaffar and R. Yap. Springer, 1996, pp. 378-391.

Tygar et al., "Cryptography: It's Not Just for *Electronic* Mail Anymore," Carnegie Mellon University Computer Science technical report CMU-CS-93-107, Mar. 1993, pp. 1-21.

* cited by examiner

TABLE I – PROPERTIES OF EXEMPLARY SPECIFIC TICKET TYPES

| Ticket Type | Anonymity | Transferability | Redemption Method Supported Consume | Present |
|---|---|---|---|---|
| Event Ticket | Yes | Yes | Only once | Yes |
| Plane Ticket | No | No | Only once | Yes |
| Lottery Ticket | Yes | No | Only once | – |
| Car Wash Ticket | Yes | Yes | Only once | – |
| Telephone Card | Yes | Yes | at times | – |
| Digital Cash | Yes | Yes | to specified value | – |
| Software License | No | Yes | – | Yes |
| Transportation Pass | Yes | No | – | Yes |
| Gate Card | No | No | – | Yes |
| Driver's License | No | No | – | Yes |

PRIOR ART

Figure 4

SYSTEM AND METHOD FOR DELIVERING AND EXAMINING DIGITAL TICKETS

BACKGROUND OF THE INVENTION

1. Field of the Invention

The present invention generally concerns electronic money, electronic tickets, electronic coupons, electronic checks, digital tickets and the like.

The present invention particularly concerns digital tickets that are (i) securely, quickly, inexpensively and efficiently producible, and deliverable over a worldwide digital communications network, (ii) visually inspectable, and physically securable and transportable, by the purchaser recipient thereof, (iii) resistant or immune to forgery (nonetheless that network interlopers, the purchaser recipient of an individual digital ticket and/or a number of purchaser recipients acting in collusion may attempt to so forge digital tickets), (iv) capable of being anonymously purchased, held and redeemed if so desired by the purchaser recipient thereof, (v) readily, quickly and securely verifiable upon redemption, including by laser scanning of a 2-D bar code format, or by the reading of data from a smart card, (vi) resistant to double redemption, or to single redemption after any reported theft, (vii) transferable and divisible, (viii) self-authenticating, (ix) versatile to incorporate diverse entitlements, (x) cancelable or redeemable without physical tender or surrender, and (xi) ecologically sound.

2. Description of the Prior Art

2.1 General Background

2.1.1 General Introduction

The volume of the electronic commerce, both business-to-business and business-to-consumer transactions, has dramatically increased in recent years. Most consumer Internet commerce are based on credit card transactions, and employ an ordinary package delivery service such as the U.S. Postal Service, United Parcel Service, Federal Express, or Airborne Express to send the items to the consumer. While completely reasonably for physical items such as books, music CDs, DVDs, or similar items, the use of physical delivery for the purchase of an abstraction such as access rights seems inappropriate.

What access rights are sold over the Internet? In early May, 1999, tickets to the movie Star Wars: The Phantom Menace were made available over the Internet for purchase by credit card before they were on sale at movie theater box offices. This is a particularly attractive alternative to waiting in line prior to the opening of a popular movie. Other types of access rights sold over the Internet include theater, ballet, concerts, and sporting events.

Currently, the purchase of movie tickets over the Internet requires the consumer to physically pick up the tickets, so in a sense it serves more as a reservation mechanism. For tickets to the theater or to sporting events where ticket values and prices are higher, the tickets are often delivered to the consumer by postal mail.

Tickets are physical objects that represent single-use access rights. Instead of delivery by post, the inventors of the present invention believe that such access rights should be delivered electronically in the form of digital tickets. Digital representations of the rights contained within a ticket must be verifiable at access points, e.g., by theater ticket takers, so the ticket would desirably be convertible to a physical, easily transportable form. To provide authenticity and verification, the digital ticket contents should be easily and inexpensively readable, being re-digitized from printed form if necessary, and should include an authentication tag such as a digital signature. The digital data within the digital ticket may be conveyed by the consumer to the venue of the ticket event in a variety of ways: digital data may be stored on a flexible disk, stored in a smart card, printed on paper, etc.

The inventors of the present invention will be seen to prefer the use of printed two-dimensional bar-codes as an extremely appropriate encoding technology for the purposes of digital tickets. See Stuart Itkin and Josephine Martell; A PDF417 primer: A guide to understanding second generation bar codes and portable data files; Technical Report Monograph 8, Symbol Technologies, April 1992. See also AIM Standard "Uniform Symbology Specification PDF417". Printed 2-D bar codes provide good fault tolerance and easy re-digitization of the contained data. Digital tickets so printed permit a reasonable initial market penetration where some slight usability in the form and contents of the ticket is traded off to exploit the available consumer hardware infrastructure: namely, many web surfers have access to printers unlike the situation for smart card reader/writers.

2.1.2 Internet Ticketing Requirements

Internet tickets may be viewed as digital representations of access rights or capabilities. They may be consumed when used, or may be valid for some period of time, e.g., a movie ticket versus a series ticket for a film series. More generally, such tickets may have restrictions on their use, e.g., a movie pass good for five matinee shows.

Unlike capabilities in traditional, capabilities-oriented operating systems, the capabilities of a digital ticket are not maintained by the kernal of the operating system that transmits or reads the ticket. Perhaps the closest analogy is the Amoeba distributed kernel's use of capabilities, where capabilities are transmitted through a network. See Sape J. Mullender, editor; *The Amoeba distributed operating system: Selected papers* 1984–1987; Centre for Mathematics and Computer Science, 1987. In the case of Internet digital tickets, however, the generated digital tickets are ultimately carried by the consumer to the movie theater or concert venue via "sneaker-net".

The functional requirements for Internet tickets may be considered, and compared with two other electronic commerce schemes with some very similar requirements: electronic money and digital postage. Differences in requirements, however, can make the detail designs quite different. The following sections 2.1.3 and 2.1.4 consider electronic money and digital postage indicia.

2.1.3 Electronic Money

An electronic commerce scheme that has many of the same requirements as digital tickets is electronic money. Electronic representations of money have some form of inherent value, much the same way that digital tickets do. See an excellent enumeration and explanation of the functional requirements of electronic money in T. Okamoto and K. Ohta; Universal electronic cash in *Advances in Cryptology—Crypto* '91, pages 324–337; Springer-Verlag, 1992.

Okamoto and Ohta list as requirements:

(1) Independence, where security of the electronic cash does not depend on some physical device.

(2) Security, where the electronic cash cannot be created except by issuing bank. Forgeries must be easy to detect. Duplicate redemption must be both detectable and traceable.

(3) Privacy, where proper usage of electronic money does not reveal consumer identity.

(4) Off-line transactability, where payment transaction does not require network access and no third party interaction is required.

(5) Transferability, where electronic money can be transferred among customers.

(6) Divisibility, where change can be made easily.

2.1.4 Information-Based Indicia, as in Electronic Stamps

Information-based indicia (IBI) provide a way to indicate on an envelope that postage has been paid. See U.S. Postal Service; Information Based Indicia Program (IBIP) New Technology Metering Devices, May 1995. The IBI standard uses a two-dimensional bar-code (PDF417) encoding a digital signature for this purpose. See U.S. Postal Service; Information Based Indicia Program (IBIP) Indicia Specification, July 1996. See also Stuart Itkin and Josephine Martell; A PDF417 primer: A guide to understanding second generation bar codes and portable data files; Technical Report Monograph 8, Symbol Technologies, April 1992.

The digital postage application is similar to that of Internet distributed digital tickets, but has requirements that force solutions to be more complex. Here, the indicia must be validated—the digital signature verified—and checked against master databases to prevent duplication, but such duplicate-spending detection may have to rely on a distributed database. Furthermore, the low value of stamps implies that for some cases, only extremely cheap fraud detection measures are cost effective. It must also be possible to print the indicium in a completely off-line manner, to limit the communications requirements at the postal centers. This leads to the use of Postal Security Devices (PSD): specialized secure co-processors which provide a secure way of maintaining account balances and performing cryptographic computations even when the PSD is in a potentially hostile environment.

Unlike indicia, tickets typically are targeted and are "spent" at some physical location indicated by the ticket itself, e.g., a movie theater, a concert hall, or sports arena. This simplifies the job of detecting duplicates, since the networking requirements are more localized than it is the case for postage indicia. At the same time, the higher value of tickets make more sophisticated fraud detection measures possible. The interactive nature of the ticket purchase transaction—which is necessary for both assigned-seating tickets and for maintaining an account of how many has been sold—permits greater flexibility in system design.

2.1.5 Internet Tickets

Many of the functional requirements for electronic money are retained for tickets. Because most tickets are consumed when used, divisibility is not a critical requirement. For the case of a pass or a concert series ticket, a simple expiration date suffices.

Tickets must be (1) On-line deliverable: users must be able to use standard web tools such as an SSL-capable web browser to purchase and take delivery of the tickets.

(2) Secure: tickets cannot be created except by the issuing venue; forgeries are easy to detect; duplicate redemption are detectable/traceable.

(3) Private: proper usage of tickets does not necessarily reveal identity. (This is not currently a property of Ticketmaster™ or Will Call™, since identification is needed to pick up tickets.)

The on-line delivery requirement simplifies many aspects of the design. Because the ticketing venue must maintain a database of sold tickets for assigned-seating tickets, and minimally a ticket count for general admission tickets, no completely online design is admissible. While overbooking is possible—and common for some applications such as airline tickets—the number of overbookings must still be limited and controlled, since excessive overbooking is economically unsound.

2.2 Specific Background 2.2.1 Security for End-Users Accessing Web Servers

A previous technology relevant to the present invention concerns a system and product of Axent Technologies, Inc. ["Axent"] Mountain View, Calif., for tightening security for end-users accessing Web servers. The technology is so relevant because, in the first place, if a client can be securely identified to a server, and vice versa, than the server may issue the client a digital ticket.

However, a more important point of comparison is more subtle. The present invention will be seen to, at certain junctures, encrypt multiple data quantities, or fields. The fourth following paragraph will reveal that an encrypted quantity—a "message authentication code"—also becomes part of a digital ticket in the Axent system.

Axent says its "Web Defender" server software delivers proper protection in generating and distributing encrypted tickets that permit users to log into multiple Web servers across the enterprise without having to enter additional passwords each time.

Better yet, Web Defender is claimed to offer networkers a way to track and manage those tickets centrally, so that they can control access to corporate data according to individual and group names. There is no need to modify the client's browser during setup.

Web Defender sits behind the corporate firewall and works in conjunction with a Web server running a copy of Internet Information Server (IIS) from Microsoft Corporation (Redmond, Wash.). It works with both Internet Explorer from Microsoft and Communicator from Netscape Communications Corporation (Mountain View, Calif.).

In setting up Web Defender the first step is to obtain a digital certificate from a third-party certificate authority like Verisign, Incorporated (Mountain View, Calif.) for the IIS Web server. This permits the Web server to initiate an SSL (Secure Sockets Layer) session with a Web browser. Next, net managers select NT domains and groups (via a GUI) that are allowed access to the Web Defender server. Groups are selected from NT domains and then cut and pasted into Web Defender. After that it's merely a matter of selecting general ticketing properties, such as having a message sent to the Web browser once the sign-on process is successful or automatically reissuing a ticket once the old one expires.

So how does the Web Defender software "pump up" security? First, a user keys in a name and password, which are authenticated by the Web Defender server. (It's important to note that passwords and user names are exchanged only once during this initial authentication, over the SSL connection). Second, the Web Defender server builds a user ticket that contains several fields of data, such as user name, lifespan of ticket, and group name; all of which define the data the ticket holder can access. Third, the ticket is run through the MD5 cryptographic algorithm developed by RSA Data Security Incorporated (Redwood City, Calif.) to generate a message authentication code, which becomes part of the ticket itself. At this point, the digital ticket is issued and stored in the memory of the user's Web browser. Once the session is completed, the ticket is deleted from the memory.

2.2.2 Previous Patents

A series of patents to Stefik, et al. and assigned to Xerox Corporation (Stamford, Conn.) deal with the distribution and use of digital works of value, including (but not limited to) digital tickets. U.S. Pat. No. 5,715,403 is for a SYSTEM FOR CONTROLLING THE DISTRIBUTION AND USE OF DIGITAL WORKS HAVING ATTACHED USAGE RIGHTS WHERE THE USAGE RIGHTS ARE DEFINED BY A USAGE RIGHTS GRAMMAR; U.S. Pat. No. 5,638,443 is for a SYSTEM FOR CONTROLLING THE DISTRIBUTION AND USE OF COMPOSITE DIGITAL WORKS; U.S. Pat. No. 5,634,012 is for a SYSTEM FOR CONTROLLING THE DISTRIBUTION AND USE OF DIGITAL WORKS HAVING A FEE REPORTING MECHANISM; and U.S. Pat. No. 5,629,980 is for a SYSTEM FOR CONTROLLING THE DISTRIBUTION AND USE OF DIGITAL WORKS. The earliest incorporated application Ser. No. 08/344,760, entitled "SYSTEM FOR CONTROLLING THE DISTRIBUTION AND USE OF DIGITAL WORKS USING DIGITAL TICKETS" did not issue as a patent.

These patents are of relevance to the present invention primarily as background, especially as regards the nature of security of a system communicating on and over a network. The use of "trusted repositories" in the patents is without direct counterpart in the basic system of the present invention. However, it will be recognized that a the present invention is susceptible of universal adaptation and deployment for use in issuing billions of tickets monthly, and not all tickets—even for the same event—will come from the same issuing authority. The Xerox patents thus show how the digital ticket issuing system and method of the present invention can be indefinitely expanded.

All these patents concern a system for controlling use and distribution of digital works. The system permits the owner of a digital work to attach usage rights to his or her work. The usage rights define how the individual digital work may be used and distributed. Instances of usage rights are defined using a flexible and extensible usage rights grammar. Conceptually, a right in the usage rights grammar is a label associated with a predetermined behavior and conditions to exercising the right. The behavior of a usage right is embodied in a predetermined set of usage transactions steps. The usage transaction steps further check all conditions which must be satisfied before the right may be exercised. These usage transaction steps define a protocol for requesting the exercise of a right and the carrying out of a right.

The patents thus relate to the field of distribution and usage rights enforcement for digitally encoded works. The deal with the fundamental issue facing the publishing and information industries in preventing the unauthorized and unaccounted distribution or usage of electronically published materials. Electronically published materials include diverse types typically distributed in a digital form and recreated on a computer based system having the capability to recreate the materials. Although the patents focus on audio and video recordings, software, books and multimedia works as exemplars of electronic publishing, digital tickets may also be considered to be electronically published works and, indeed, ones of at least transitory value.

The Xerox patents address the problem of the secure distribution of digital works by use of trusted repositories. Many of the powerful functions of repositories—such as their ability to "loan" digital works or automatically handle the commercial reuse of digital works—are possible because they are trusted systems. The systems are trusted because they are able to take responsibility for fairly and reliably carrying out the commercial transactions. That the systems can be responsible ("able to respond") is fundamentally an issue of integrity. The integrity of repositories has three parts: physical integrity, communications integrity, and behavioral integrity.

Physical integrity refers to the integrity of the physical devices themselves. Physical integrity applies both to the repositories and to the protected digital works. Thus, the higher security classes of repositories themselves may have sensors that detect when tampering is attempted on their secure cases. In addition to protection of the repository itself, the repository design protects access to the content of digital works. In contrast with the design of conventional magnetic and optical devices—such as floppy disks, CD-ROMs, and videotapes—repositories never allow non-trusted systems to access the works directly. A maker of generic computer systems cannot guarantee that their platform will not be used to make unauthorized copies. The manufacturer provides generic capabilities for reading and writing information, and the general nature of the functionality of the general computing device depends on it. Thus, a copy program can copy arbitrary data. This copying issue is not limited to general purpose computers. It also arises for the unauthorized duplication of entertainment "software" such as video and audio recordings by magnetic recorders. Again, the functionality of the recorders depends on their ability to copy and they have no means to check whether a copy is authorized. In contrast, repositories prevent access to the raw data by general devices and can test explicit rights and conditions before copying or otherwise granting access. Information is only accessed by protocol between trusted repositories.

Communications integrity refers to the integrity of the communications channels between repositories. Roughly speaking, communications integrity means that repositories cannot be easily fooled by "telling them lies." Integrity in this case refers to the property that repositories will only communicate with other devices that are able to present proof that they are certified repositories, and furthermore, that the repositories monitor the communications to detect "impostors" and malicious or accidental interference. Thus the security measures involving encryption, exchange of digital certificates, and nuances described below are all security measures aimed at reliable communication in a world known to contain active adversaries.

Behavioral integrity refers to the integrity in what repositories do. What repositories do is determined by the software that they execute. The integrity of the software is generally assured only by knowledge of its source. Restated, a user will trust software purchased at a reputable computer store but not trust software obtained off a random (insecure) server on a network. Behavioral integrity is maintained by requiring that repository software be certified and be distributed with proof of such certification, i.e. a digital certificate. The purpose of the certificate is to authenticate that the software has been tested by an authorized organization, which attests that the software does what it is supposed to do and that it does not compromise the behavioral integrity of a repository. If the digital certificate cannot be found in the digital work or the master repository which generated the certificate is not known to the repository receiving the software, then the software cannot be installed.

All repositories provide a core set of services for the transmission of digital works. The manner in which digital works are exchanged is the basis for all transaction between repositories. The various repository types differ in the ultimate functions that they perform. Repositories may be devices themselves, or they may be incorporated into other systems.

A repository will have associated with it a repository identifier. Typically, the repository identifier would be a unique number assigned to the repository at the time of manufacture. Each repository will also be classified as being in a particular security class. Certain communications and transactions may be conditioned on a repository being in a particular security class.

As a prerequisite to operation, a repository will require possession of an identification certificate. Identification certificates are encrypted to prevent forgery and are issued by a Master repository. A master repository plays the role of an authorization agent to enable repositories to receive digital works. Identification certificates must be updated on a periodic basis. Identification certificates are described in greater detail below with respect to the registration transaction.

A repository has both a hardware and functional embodiment. The functional embodiment is typically software executing on the hardware embodiment. Alternatively, the functional embodiment may be embedded in the hardware embodiment such as an Application Specific Integrated Circuit (ASIC) chip.

The hardware embodiment of a repository will be enclosed in a secure housing which if compromised, may cause the repository to be disabled. The basic components of the hardware embodiment of a repository include a processing means, a storage system, a clock and an external interface.

The core repository services comprise a set of functions required by each and every repository. The core repository services include the session initiation transactions. This set of services also includes a generic ticket agent which is used to "punch" a digital ticket and a generic authorization server for processing authorization specifications. Digital tickets and authorizations are specific mechanisms for controlling the distribution and use of digital works. Note that coupled to the core repository services are a plurality of identification certificates. The identification certificates are required to enable the use of the repository.

For one-time usage rights, a variant on this scheme is to have a digital ticket. A ticket is presented to a digital ticket agent, whose type is specified on the ticket. In the simplest case, a certified generic ticket agent, available on all repositories, is available to "punch" the ticket. In other cases, the ticket may contain addressing information for locating a "special" ticket agent. Once a ticket has been punched, it cannot be used again for the same kind of transaction (unless it is un-punched or refreshed in the manner described below.) Punching includes marking the ticket with a timestamp of the date and time it was used. Tickets are digital works and can be copied or transferred between repositories according to their usage rights.

In the currently preferred embodiment, a "punched" ticket becomes "un-punched" or "refreshed" when it is copied or extracted. The Copy and Extract operations save the date and time as a property of the digital ticket. When a ticket agent is given a ticket, it can simply check whether the digital copy was made after the last time that it was punched. Of course, the digital ticket must have the copy or extract usage rights attached thereto.

The capability to un-punch a ticket is important in the following cases:

(1) A digital work is circulated at low cost with a limitation that it can be used only once.

(2) A digital work is circulated with a ticket that can be used once to give discounts on purchases of other works.

(3) A digital work is circulated with a ticket (included in the purchase price and possibly embedded in the work) that can be used for a future upgrade.

In each of these cases, if a paid copy is made of the digital work (including the ticket) the new owner would expect to get a fresh (un-punched) ticket, whether the copy seller has used the work or not. In contrast, loaning a work or simply transferring it to another repository should not revitalize the ticket.

2.2.3 Framework for a General-Purpose Digital Ticket

Ko Fujimura and Yoshiaki Nakajima of NTT Information and Communication Systems Labs are active in digital tickets. Mr. Fujimura conceives of a flexible digital ticket whose main purpose is to develop a generic value-circulation medium that prevents double-spending. In this context, a ticket is a digital medium that guarantees certain rights to the owner of the ticket. Describing tickets this generally allows the tickets to contain many different values and types of values in a single ticket (or group thereof).

Mr. Fujimura claims that a general ticket framework will reduce the implementation cost in many cases because a single design can be used in many places. By being general, the tickets can be composed arbitrarily, allowing bundling and similar features. He claims that the creation of new businesses to run this framework, like issuing/revocation services and deposit box services, was a benefit.

A general-purpose digital ticket framework must meet most of the requirements of digital cash. Additional requirements are: (1) A ticket can control its anonymity, divisibility, and transferability depending on the application; (2) The individual specifications of a ticket need to be "machine understandable" to allow for the redemption of goods or services; (3) Ticket properties whose values change while it is circulated (e.g., payment or reservation status) must be changed securely; (4) A ticket that comprises more than one sub-tickets must be supported.

To implement such a framework, the authors created a Ticket Definition Language that allows for the specification of ticket properties. The tickets themselves are hypertext-based, allowing automation of the state-transitions and composability features. The tickets can also include dynamic information that is up-to-date when the ticket itself is used. Another feature (of less obvious utility) is that the tickets can contain very large data such as images and sounds.

The tickets themselves are inherently online (because of their hypertext basis and dynamic nature), but can also be circulated offline using smart cards. In either case, the system uses signed URIs to test the currency of the ticket. The meaning and constraints of the properties in the tickets are defined using the Resource Description Framework. Schemas for tickets can thus be controlled by the issuers of the tickets, and various restrictions can be contained in these schemas.

Fujimura outlined the ticket trust model. The issuer certificate, user certificate, and examiner certificate, which are required to issue, transfer, consume, or examine a ticket, are specified in the ticket itself using the Ticket Definition Language. So, any ticket with a public key, such as drivers' licenses, can be used as a public key certificate if a ticket specifies them as a required certificate for the ticket. In other words, any ticket can play a roll in the public key infrastructure for other tickets.

Fujimura and Nakajima are drafting specifications for the implementation and intend to submit them to standards organizations. The goal of their project is to "Transform any Web terminal into a ticketing machine for any ticket in the world." The present invention has the same goal.

2.2.4 XML Ticket: Generalized Digital Ticket Definition Language

There is an effort, spearheaded by Nippon Telephone and Telegraph (NTT) to formulate a generalized digital ticket definition language called "XML Ticket". This definition language, and this prototype standard, are in no way in conflict with the present invention. The standard concerns what a digital ticket of general format should contain; the present invention concerns how to securely generate and redeem a digital ticket.

Ko Fujimura, Yoshiaki Nakajima, and Jun Sekine of NTT Information Sharing Platform Laboratories write that the World Wide Web provides an information delivery infrastructure for various types of digital contents used in daily life. Payment infrastructures such as digital cash, micropayments, and encrypted credit cards have also been established. However, no digital medium or infrastructure that prevents duplicate redemption and enables the trading of various rights, much like paper tickets, has been established yet.

Messrs. Fujimura, Nakajima and Sekine have thus sought to develop a generalized digital ticket system that can circulate any type of rights. A digital ticket is a digital medium that guarantees certain rights of the ticket owner and it includes software licenses, resource access tickets, event tickets, plane tickets, etc. To circulate various types of digital tickets using a common ticket processing system, they propose a general-purpose digital ticket framework, in which a ticket is circulated by interpreting ticket properties such as anonymity, transferability, and the redemption method, specified in the ticket itself using the XML based Generalized Ticket Definition Language.

Traditional digital ticket systems were developed for each application. However, Messrs. Fujimura, Nakajima and Sekine believe that a generalized digital ticket system is necessary for the following reasons:

(1) A ticket processing system includes a ticketing system, ticket wallet, ticket examination system, and the implementation cost of these components becomes expensive if a system must be developed for each individual application. For example, it is impractical to develop an individual system for an application that issues only 20 tickets.

(2) It is desirable for users to manage various tickets using a common "ticket wallet" that provides a uniform and collected view as a real physical wallet, in which cash, credit cards, ID cards, and various tickets are stored together.

(3) New network businesses such as revocation, packaging, and safety deposit box services can be run if any ticket can be managed uniformly. If the format and protocols for digital ticket circulation depend on the ticket, it would be difficult to run these businesses successfully.

As a result of their investigation on diverse physical tickets, Messrs. Fujimura, Nakajima and Sekine have identified the following requirements for the generalized digital ticket definition language:

(1) Composability: The language must support a composite ticket that comprises multiple sub-tickets. There are many cases when a sub-ticket must be issued separately with the original ticket typically because the tickets are issued by different organizations or issued at different times.

(2) State manageability: The language must support the defining of properties whose values dynamically change while in circulation, e.g., payment, reservation, or approval status. Note that it is difficult to allow these changes in a signed document.

(3) Machine-understandability: The language must support the defining of the meaning of the ticket. If the service or task that a ticket guarantees is objectively understood by the buyer and seller before conducting a transaction, it will reduce the number of disputes resulting from misunderstanding of the meaning of the ticket.

(4) Efficiency: The language must enable the efficient defining of a ticket, since it might be stored in a smart card or other devices with restricted memory. Longer definitions also cause longer data transfer time, which might not be acceptable. For example, redemption of event tickets or transportation passes requires high performance.

(5) Circulation controllability: The language must provide the parameters needed to allow flexible circulation control. As shown in Table I, the anonymity, transferability, and redemption method of the ticket must be specified in the ticket definition. Additionally, it is desirable to support more advanced requirements, e.g., tickets can be circulated within the registered members of a group or only qualified shops can issue tickets.

(6) Security: The investigators perceive that the language must provide the parameters needed to achieve security. (The present invention teaches that the method, and contents of the ticket—not the language in which its contents are represented—is what provides the security.) The digital ticket system must support a facility for preventing duplicate redemption similar to a digital cash system. It requires an online currency checking system or tamper-proof devices such as a smart card as well as digital signature technologies.

The investigators adopted extended markup language, or XML, as the base language of the Generalized Digital Ticket Definition Language, since they allege to satisfy the above requirements as described below:

(1) Composability: A composite ticket is claimed to be definable using XML links. A composite ticket in which sub-tickets are distributed over the Internet is claimed to be easily implementable. It is claimed that this facility is useful especially for tickets that are often revoked and when online checking is required.

(2) State manageability: The state-transition properties of a ticket is claimed to be uniformly defined by attaching a value change ticket to the restriction-specified incomplete link.

(3) Machine-understandability: The meaning of a ticket is defined using the Resource Description Framework (RDF) Model; the Syntax Specification (see http://www.w3.org/TR/REC-rdf-syntax); and and the Resource Description Framework (RDF) schemas (see http://www.w3.org/TR/REC-rdf-schema), which are layered on XML. It is claimed that this will make searching for tickets over the Internet much easier.

(4) Efficiency: By circulating the link to contents such as ticket images or contract details instead of defining the contents on the tickets themselves, it is claimed that the size of the ticket can be reduced. The link is also asserted to provide up-to-date information over the Internet. For example, an event ticket may include a link to the place where the event will be held after it was postponed due to rain or something else.

(5) Circulation controllability & Security: XML is a generic language designed to describe any structured data and thus any parameters necessary to control ticket circulation can be defined. Establishing control parameters or security parameters, which are necessary to satisfy these requirements, do not significantly influence the language as a ticket processing system.

Reference R. D. Brown, "Digital Signatures for XML", IETF Internet Draft, January 1999; K. Fujimura and Y. Nakajima, "General-purpose Digital Ticket Framework", 3rd USENIX Workshop on Electronic Commerce, August 1998, pp. 177–186. (See http://www.usenix.org/publications/library/proceedings/ec98/fujim ura.html.) Reference also K. Fujimura, Hiroshi Kuno, Masayuki Terada, Kazuo Matsuyama, Yasunao Mizuno and J. Sekine, "Digital Ticket Controlled Digital Ticket Circulation", to appear; and Y. Nakajima and K. Fujimura, "The XML Ticket Specification", unpublished manuscripts. Reference also XML Schema Requirements, The World Wide Web Consortium, Note, February 1999. (See http://www.w3.org/TR/NOTE-xml-schema-req).

The relevance of all this work to the present invention is: it all applies. The present invention concerns the manner of securely generating, distributing and redeeming a digital ticket, and has no quarrel, and, indeed, some agreement, that the information within the ticket (and still other information, such as patterns of ticket circulation, or geographical sites that are enabled to purchase tickets) should be expressed in an advanced language such as XML.

2.3 Digital Signatures

The present invention will be seen to employ a digital signature—a routine concept in the cryptographic arts. The present invention is fully operative with many different schemes of producing digital signatures.

For example, in the Rivest Shamir Aldeman (RSA) public key encryption system, a party has both a public key (N,e) and a secret key (N,d), where N is a k-bit modulus, the product of two (k/2)-bit prime numbers, and e, $d \in Z_{\phi(N)}^*$ satisfy $ed \equiv 1 \mod \phi(N)$. The RSA function f: $Z_N^* \rightarrow Z_N^*$ is defined by $f(x)=x^e \mod N$ and its inverse $x^{-1}$: $Z_N^* \rightarrow Z_N^*$ is defined by $f^{-1}(y)=y^d \mod N$ ($x, y \in Z_N^*$), where $Z_N^*$ denotes the set of numbers between 1 and N−1 which are relatively prime to N). The function f can be used for encryption, and the function $f^{-1}$ for decryption. The generally-made assumption is that f is trapdoor one-way: roughly, if one does not know d (or he prime factors of N) then it is hard to compute $x=f^1(y)$ for y drawn randomly from $Z_N^*$.

A widely employed paradigm to sign a document M is to first compute some "hash" y=Hash(M), and then set the signature to $x=f^{-1}(y)=y^d \mod N$. To verify that x is a signature of M, one computes $f(x)=x^e \mod N$ and checks that this equals Hash (M). This technique is the basis for several existing standards.

SUMMARY OF THE INVENTION

The present invention contemplates a digital instrument—nominally called a "digital ticket" although the concept is somewhat broader—that may be both (i) securely ordered and (ii) securely delivered across a communications channel and/or upon a communications network, such as the Internet particularly including the World Wide Web. Once delivered to the purchaser, the digital ticket may be thereafter be (iii) inspected in the form of plain text and accompanying imagery (plus more, as will be discussed) displayed on a computer monitor, or, preferably, as printed, permitting the purchaser, and any parties subsequently possessing the digital ticket, to clearly read, see, agree and remember just exactly what the digital ticket is for. The digital ticket is (iv) commonly reduced by the purchaser to a compact physical form, most commonly a printed piece of paper or, more rarely, a transportable memory device such as a smart card or a computer disk. In this its physical form the digital ticket may be (v) securely stored, and transported at some time(s) to some place(s) (that were determined when the ticket was initially delivered) in order to redeemed for some entitlement(s) determined when the ticket was purchased, most commonly an admission to an event. When tendered for redemption, the digital ticket is (vi) quickly, securely and inexpensively validated and verified to definitively determine whether the ticket is either legitimate or a forgery. It may also be determined whether the same ticket, or copies thereof, has (have) been tendered for the same event more than once.

1. The Qualities of A Digital Ticket in Accordance With the Present Invention

The digital ticket of the present invention is cost effective: it is easy, expeditious and inexpensive to order, make, handle, transport and tender.

In particular, such portions of the digital ticket as are generated in the network-connected computer of the ticket purchaser are not computationally intensive; such calculations as are performed may typically be expeditiously realized by a small Java applet running in the browser of the consumer's computer. (The network-connected computer of the ticket producer is normally more powerful, but not inordinately so.) Neither does the purchase, nor the transmission, of the digital ticket involve the network communication of any great amount of information. Accordingly, purchase of the digital ticket normally transpires just as fast as, or faster than, any e-commerce transaction.

Purchase of the digital ticket is equally as easy as any e-commerce transaction. The purchaser is not forced to think of, nor remember, any password, code, key or anything of that order.

In particular, the physical medium of the digital ticket is inexpensive and, ultimately, disposable. The physical medium of the digital ticket is typically a 2-D bar code printed on, most typically, a sheet of plain paper of, most typically, rectangular shape of some few square inches size.

The digital ticket of the present invention may typically be purchased, made, and, most especially, redeemed very quickly. The ticket is normally procured upon the internet with the same time delay as any purchase. Despite the sophistication and extent of information that the digital ticket contains, it is typically readily printed as a 2-D bar code plus accompanying text and graphics by a graphics printer of any common type as driven by the user's browser and operating system software in but a few tens of seconds elapsed time.

Most importantly, redemption of the ticket typically entails the scanning of the 2-D bar code by a wand that is connected to a portable computer (that need not even invariably be networked) of the ticket taker and gate keeper. The reading of the ticket goes very fast, and is essentially foolproof and error-free regardless of the intelligence or diligence—or lack thereof—of the ticket taker. The ticket taker's computer makes all the decisions. Regardless that the ticket taker's computer so functions to decode diverse information in the digital ticket, it is quite amazingly possible—normally in abnormal situations, and then only where and when an indexed guide to the 2-D bar codes of valid tickets sold has been printed and distributed to gate keepers before an event—to actually validate a digital ticket manually, and without use of a computer.

The digital ticket of the present invention is secure in many ways.

The digital ticket is secure in production. The cryptographically protected portion of a legitimate ticket may be created only by a ticket producer/seller at a secure facility. Moreover, the security of the digital ticket in the hands of the purchaser of the ticket does not depend upon any physical device, but on cryptology. It is difficult to the level of practical impossibility to fraudulently create a valid digital ticket. Although information communicated in each of two directions between a ticket consumer/buyer and a ticket provider/seller is encrypted, the security of the digital ticket is not solely based in cryptoanalytical security, but in the physical security of a key, called a signature key, that is known only to the ticket producer/seller.

The digital ticket is secure in redemption. While unauthorized duplication of a legitimate digital ticket may be possible and, in certain cases, even straightforward, only one, first-presented, digital ticket will be redeemed for any one occurrence or event subscribed to by operation of the ticket—making copies of a valid digital ticket essentially worthless.

The security of the digital ticket is visible. Forgeries, or illegitimate digital tickets, are easy to detect, including, most preferably, by a computer-driven display depicting the illegitimate 2-D bar code upon a tendered illegitimate ticket in proximity to such legitimate 2-D bar code as that particular ticket should possess if legitimate. Such a visual display gives both the gate keeper and the person tendering the ticket an on-the-spot visual showing of why a ticket should be deemed illegitimate.

Purchase, and redemption, of the digital ticket of the present invention is a straightforward transaction between ticket purchaser/consumer and the ticket producer/seller, and also between the ticket redeemer and the ticket collector (either or both of which redeemer and collector may, or may not, be the same person(s) as the ticket purchaser/consumer or the ticket producer/seller), with no intervention required by any third party. The purchaser/consumer of the digital ticket, in particular, need only understand and follow the simplest of directions: (1) buy the ticket, (2) print it, and (3) redeem the printed ticket.

The digital ticket of the present invention may be purchased, and redeemed, anonymously. According to this characteristic, it is also transferable from person to person. Nonetheless that the ticket may be procured and presented anonymously, if an original or an earlier holder of the ticket alleges theft of the ticket and notifies the police of this event, then it is possible from any records of the (alleged) victim (including, of course, a rare copy of the actual ticket made by the victim) and, more commonly, from certain records of the ticket seller as may be selectively kept (at the seller's volition, depending upon any secretive nature of the event), to recognize the (allegedly) stolen ticket upon its presentment, and to identify the presenter to the police. This is true even if there is nothing ostensibly unique to the ticket, such as a particular seat number.

Nonetheless that a digital ticket of the present invention may be purchased, and/or redeemed, anonymously if required or desired, if the original purchaser of the ticket wants his or her name, address, identifying numbers and/or the like placed on the ticket in secure ciphertext or plain text or both, then this is easily done, creating a digital ticket that may be as customized, and as data laden, as the purchaser could possibly desire. Indeed, inclusion of this data is recommended for honest consumers who desire to "hold tight to their legitimately-purchased tickets".

Nonetheless that individual ticket holders and users may be completely anonymous, the ticket seller may not only accrue such demographic information as comes from having initially sold the digital ticket upon, most commonly, the Internet, but may also correlate, inter alia, the times and dollar amounts of ticket sales with later ticket redemptions, coming thereby to a useful understanding of, inter alia, the effects of marketing strategies that make ticket price dependent upon the time of ticket purchase.

In accordance that the digital ticket of the present invention may readily be transferred and re-transferred, normally between holders in due course, any rights that are within the ticket that are subject to division may be divided. For example, if the ticket is good for five film matinees of unspecified dates, five different people may use the ticket for one matinee each at the same or at different times. (Redemption of tickets for multiple events is by networked computers with memories of outstanding multiple-use tickets, and of ticket partial redemptions.)

(Conversely to the concept that anonymity of a ticket purchaser/ticket redeemer may be preserved under the present invention, it is alternatively possible to use computers to monitor and control absolutely every aspect of the ticketing and ticket redemption process in real time. Thus a party with access to residual data on the computer of a "Doctor Jones" could call a football stadium at game time and be told "Dr. Jones entered at gate E3 at 2:22 P.M. and is assigned seat 43L22.")

The digital ticket of the present invention may be canceled, and any monies paid therefore refunded, without physically repossessing the digital ticket.

The digital ticket of the present invention is flexible, and versatile: any one ticket can be for any desired combination of entitlements, and presentation (or non-presentation) of the ticket for any one event is without effect on its later presentment for another event. If a purchased digital ticket printed on paper wears, or is expected to wear, thin from use, then multiple copies may be printed (but may not be concurrently fraudulently redeemed, see above).

A single use ticket is normally neither collected nor defaced nor physically damaged at an event, potentially reducing ticket litter. Indeed, printed digital tickets may be passed through a reader which, while validating the digital ticket by reading a 2-D bar code on its obverse side, imprints the reverse side with an advertisement or a coupon or the like, delivering thereby timely notice and incentive to the ticket holder to, by way of example, "Save $4 With This Coupon—Dine on Pizza at Joe's Pizza Parlor" after the event. The digital ticket is ecologically sound: clearly it contains no plastic nor any expensive hologram nor anything of that nature.

The digital ticket of the present invention provides proof, sufficient for admission in a court of law if necessary, of its own legitimacy. If a person presents a fake (or, in some cases, a stolen) ticket, then this can immediately summarily be determined. Even though the gate keeper's computer employ a private cryptographic key, this key need not be revealed (as in legal discovery attendant upon a criminal prosecution) to prove that a tendered ticket is forged.

Conversely, if a ticket producer/seller was to default in delivery of the promised goods to a legitimate buyer of the ticket, then this ticket producer/seller can immediately summarily be found to have created a binding contract, usually complete in all pertinent conditions, contained within the data of the digital ticket. If the ticket producer/seller was to falsely claim that a legitimate ticket is a copy, and has been previously redeemed, then this eventuality can also be addressed—but only if the ticket redemptions are interactive.

A digital ticket in accordance with the present invention thus incorporates almost every benefit that can be conceived. The only recognized conditions associated with a digital ticket in accordance with the present invention that might be judged sub-optimal are few, and mostly insignificant.

First, the digital ticket is commonly purchased across the Internet by the ticket consumer, or someone acting on the consumer's behalf such as a commercial ticket vender. Connection to a communications network, and particularly to the Internet, thus effectively becomes the only practical way of getting a ticket.

Second, the ticket must be printed or stored on portable memory media, or stored in a smart card, by the purchaser of the ticket or his or her agent; respectively requiring the ticket purchaser to have a computer printer, a disk drive of the like, or a smart card writer.

Third, in accordance that the digital ticket is printed by the purchaser, it may be of only modest appearance, and monochrome in coloration, regardless that the entitlement that it provides may have cost a great deal of money. This simply means that the digital ticket may not look as expensive as is the right that it embodies.

Fourth, utmost quality and performance in ticket verification, ticket redemption, and gate keeping requires both (i) computers, preferably networked computers, and (ii) digital ticket readers, most commonly optical readers. Electric power at or near to ticketed events is thus normally required. Although no single computer nor reader is a serial reliability element in the ticket verification and redemption process, a large crowd awaiting rapid processing for speedy entrance into an intensely-awaited event may give rise to a fail-safe requirement. Both (i) computer and (ii) reader hardware used is normally reliable and/or redundant in order that digital ticket processing should be on no account suspended or delayed. (It should be noted that prospective entrants to an event will overwhelmingly have legitimate tickets but no portable printers to hand, and that in the event of total breakdown of an electronic admissions system it may be possible to compare the tendered tickets against books of pre-printed tickets sorted to portal of event entry, or even to simply admit persons showing tickets.)

Fifth and finally, in the rare instance that the ticket producer/seller is overbooking his events, and denying entry to late-arriving legitimate (digital) ticket holders under pretext that the tickets are copied, then this fraud can be proved from the (digital) ticket itself only if ticket redemption is interactive, as normally requires that the digital ticket be embodied in a smart card. (It should be noted that little may be conclusively proved regarding overbooking of open-seating events under present ticketing and ticket redemption procedures.)

2. A Method of Delivering a Digital Ticket

Therefore, in one of its aspects the present invention is embodied in a computerized method by which a "ticket" provider may deliver a digital "ticket" to a "ticket" consumer across a communications channel.

A computer of a ticket provider first transmits across a communications channel to a computer of a prospective ticket consumer data regarding an occurrence, or "event" for which enabling chits, called "tickets" may be had. The (i) occurrence is commonly an event, the (ii) communications channel is commonly the World Wide Web, and the (iii) enabling chit is commonly a ticket of admission. However, the method of the invention is not restricted to such (i) usage, such (ii) communications channel, nor such (iii) application in time, space or nature. For example, a digital "ticket" may be purchased in a store, carried to a warehouse, and redeemed for some good(s).

Normally, however, a prospective ticket consumer, deciding to obtain a ticket for a particular selected event and thus to become a ticket consumer, causes his/her computer to produce a number R. This number R contains at least (i) a random number component. It may be considered a precursor three steps removed, or a "third precursor", to what will ultimately become a digital ticket.

The number R may optionally additionally contain or be accompanied by other information such as, for example, any of (ii) the identity of the consumer, (iii) the event for which a ticket is sought, and number of attenders, and/or (iv) the basis for payment for the ticket, if payment is required. Notably, none of this information (ii)–(iv) has to be incorporated in the number R, which must only contain the (i) random number component. It is perfectly acceptable that the consumer's provision of information such as his/her name for incorporation within the number R (and, ultimately, within the digital ticket to be provided to the consumer), should be completely optional, with the digital ticketing process continuing unimpeded and substantially undifferentiated should the consumer decline to provide this information.

A computer of the ticket consumer then calculates a one-way function of the number R, i.e., as hash(R) or h(R). This one-way function may be any of many different functions mathematically recognized to be computationally intractable of being reversed so that the source number R could be derived from the hash(R). The SHA1 and MD5 functions are in particular suitable, and preferred. The hash (R) may be considered to be a precursor two steps removed, or a "second precursor", of what will ultimately become the digital ticket.

This calculated hash(R) is then second transmitted across the communications channel from the computer of the ticket consumer to the computer of the ticket provider. Additional ticket order data, such as any of information (ii)–(iv) may, and commonly does, accompany the second transmittal of the hash(R). All second transmittals may even be sent upon a secure channel (SSL, or Secure Sockets Level) as is established between the computer of the ticket seller, normally a server on the Internet, and the client computer of the ticket consumer running a browser program. However, for the method of the present invention it is essential only that the hash(R) be transmitted. It may be imagined, for example, that tickets for a set event are being distributed free, first-come first-serve to all corners. In this case there is really no need for additional ticket order data.

The computer of the ticket provider receives the hash(R), and any supplemental ticket order data, upon the communications channel. The ticket request intending to be fulfilled, the computer of the ticket provider appends additional information I to the hash(R), i.e., as I∥hash(R). This additional information I may include information from the ticket purchaser, if any such has been provided and the ticket provider wishes to incorporate such information in the ticket. Notably, however, this information I will be meaningful to the ticket provider to identify at least a particular event for which the ticket was sold, if not commonly also the seat and the ticket price, etc. Indeed, the additional information I may potentially be quite extensive.

If the ticket request is susceptible of being fulfilled, then the computer of the ticket provider makes yet another digital ticket precursor signed with a signature key s—known only to the ticket provider—as the digitally signed combination of hash(R) and I, i.e., as Sign(s,I∥hash(R)). This number Sign(s,I∥hash(R)) may be considered a precursor one step removed, or the "first precursor", to what will ultimately become the digital ticket. The digital ticket first precursor Sign(s,I∥hash(R)) is then transmitted across the communications channel from the computer of the ticket provider to the computer of the ticket consumer. Accordingly, this number, this first precursor, Sign(s,I∥hash(R)) is (i) known to both provider and consumer, (ii) meaningful to at least the provider to identify at least a particular event for which the ticket was sold (if not commonly also the seat and the price, etc.), and (iii) may potentially include potentially extensive additional information.

The consumer's computer then appends the number R to this number Sign(s,I∥hash(R)), forming thereby Sign(s, I∥hash(R))∥R. This, finally, is the digital ticket.

This number Sign(s,I∥hash(R))∥R is normally organized, and displayed, as a two-dimensional bar code of predetermined size. The PDF417 and the QR two-dimensional bar code standards are preferred.

The computer of the ticket consumer, having calculated the digital ticket from information both received (i.e., Sign (s,I∥hash(R))) and stored (i.e., R) then writes this complete digital ticket Sign(s,I∥hash(R))∥R to a transportable storage medium.

This storage medium may be the memory of the consumer's computer itself, should this computer suitably be transported and interfaced for retrieval of the digital ticket stored therein.

This storage medium may be the memory of a smart card, or of a magnetic disk, or of a CD/ROM should the consumer be possessed of these devices. Presently (circa 1999) these devices and their media are more expensive, less ubiquitous, and possessed of much greater storage capacity than is required or desired for storing a digital ticket.

The storage medium is preferably common paper, as is printed by the consumer's computer. The paper ticket shows (i) the two-dimensional bar code plus, optionally, (ii) any information particular to the one consumer as either the ticket provider, and/or the ticket consumer himself/herself, may optionally provide, plus (iii) any generic information regarding the event, and the particular ticket, as may be optionally provided. For example, if the ticket consumer has provided his/her name, then the paper ticket may be imprinted with (ii) this name. Although confirmation of ticket holder identity is not normally required for use of the ticket, as will be discussed, the presence of a name upon the ticket can be useful if, for example, (i) the event to which the ticket applies excludes minors, and/or (ii) some individual or group is claiming un-authorized expropriation, or duplication, or his/her/their ticket(s). Further for example, (iii) generic information regarding the event may include the event location, date and time, and the seat(s) for which the digital ticket is valid. Notably, this information (ii) and (iii), if it is optionally present, must not be considered to be information deterministic of the validity, and legitimacy, of the ticket, which validity and legitimacy is determined by (i) the two-dimensional bar code, only. The optional additional information (ii), (iii) should be considered to be a form of "helps", useful to both ticket provider and consumer alike to potentially "have to hand", and/or "sort out", certain facts and/or issues attendant upon mis-use or fraudulent redemption of the ticket. (If the ticket is used normally, and redeemed without fraud, then all pertinent information is certified automatically by computer, and no one is ever required to pay any attention whatsoever to any of this additional information which may optionally be printed on the digital ticket.)

The method of the present invention continues, after delivery of the digital ticket to the consumer and storage of the digital ticket by the purchaser, with use of the digital ticket by the ticket purchaser at the particular selected event.

This requires (i) transporting the transportable storage medium within which the digital ticket is written to the particular selected event, (ii) tendering the digital ticket within the transportable storage medium for verification and for admission to the particular selected event, and (iii) reading the complete digital ticket Sign(s,I∥hash(R))∥R from the transportable storage medium.

The (event) computer reading the ticket is in privity with the ticket producer's computer. (If communication links are suitable, the event computer and the ticket producer's computer may be one and the same, wheresoever physically situated.) Namely, the (event) computer knows the digital verification key v of the ticket producer, which digital verification key v corresponds to the digital signature key s of the ticket producer. Having read the digital ticket Sign(s, I∥hash(R))∥R, it extracts the R, which will shortly be used. It then decrypts the Sign(s,I∥hash(R)) using the digital verification key v to get the I∥hash(R) (which, as will be recalled, is no function at all, but merely the combination of I and hash(R). The extracted R is then used to newly calculate, using the same one-way function previously used by the consumer's computer, a new hash(R). The decrypted hash (R) is compared to the newly (re)calculated hash(R).

If the read Sign(s,I∥hash(R))∥R BOTH (1) decrypted, in the Sign(s,I∥hash(R)) portion by use of the digital verification key v to get a I∥hash(R), AND (ii) the decrypted hash(R) is equal to the newly (re)calculated hash(R) THEN the digital ticket is genuine. If either of these two conditions fail, then the digital ticket is forged. Namely, if either (i) decryption, or (2) comparison fails, then the ticket is void.

If both conditions are met—the decryption using the digital verification key v to get a I∥hash(R) works and the newly (re)calculated hash(R) equals this same quantity as was originally stored in the digital ticket upon its production and delivery for the instant particular selected event—then the ticket must be for the proper event (as defined by I), and it must still be assessed whether the particular digital ticket is the first such presented. If the contents of the read (and decrypted) digital ticket are first uniquely presented, then the holder of the digital ticket is granted admission to the event. If, to the contrary, the read digital ticket is not the first uniquely so presented, then the holder of the digital ticket is normally denied admittance.

3. A System For Delivering a Digital Ticket

In another one of its aspects the present invention is embodied in a system for delivering a digital ticket across a communications network. In this aspect, it may be considered how the functionality of the system is partitioned; what, exactly, goes on in each of the computers of the ticket consumer and the ticket provider, and what, exactly, is communicated upon the digital communications network.

The system includes a ticket consumer's computer, connected to the communications network, (i) first calculating a number R, (ii) second calculating a one way function of R to produce hash(R) as ticket order data, (iii) first transmitting the second-calculated hash(R) ticket order data upon the communications network to a ticket provider's computer as a ticket order for a particular selected event, (iv) first receiving a digitally signed combination of hash(R) and information I, Sign(s,I‖hash(R)), as a digital ticket precursor (v) third calculating an appending of R to this digital ticket precursor Sign(s,I‖hash(R)), giving Sign(s,I‖hash(R))‖R, as a full digital ticket, and (vi) first storing this third-calculated full digital ticket Sign(s,I‖hash(R))‖R in a transportable storage medium.

A ticket provider's computer, also connected to the communications network, (i) second receives from the ticket consumer's computer the first-transmitted hash(R) ticket order data, (ii) adds information I regarding the event or other right for which the ticket is had, (iii) fourth calculates a digitally signed encryption of this second-received hash(R) and the information I, or Sign(s,I‖hash(R)) as the digital ticket precursor, and (iv) second-transmits the fourth-calculated Sign(s,I‖hash(R)) digital ticket precursor across the communications channel to the ticket consumer's computer.

A communications network (i) first communicates at a first time so that the first-transmitting of the ticket consumer's computer corresponds to the second-receiving of the ticket provider's computer, and (ii) second communicates at a second time so that the fourth-transmitting of the ticket provider's computer corresponds to the first-receiving of the ticket consumer's computer.

4. A Digital Ticket

In yet another one of its aspects the present invention is embodied in a digital ticket procured by a ticket consumer upon a communication network from and by interaction with a ticket provider. In this aspect of the invention we concentrate upon exactly what is within the digital ticket, proper, and exactly what sequence of information manipulation and interchange led to these contents.

The digital ticket is embodied in a tangible transportable data storage medium containing Sign(s,I‖hash(R))‖R where (i) R is a random number private to the ticket consumer, (ii) hash(R) is a number that is a one-way function of R, (iii) I‖hash(R) is the appending, or combination, of information I concerning the event (or right) for which the ticket is had to the hash(R), (iv) Sign(s,I‖hash(R)) is a digitally signed encryption of the combined I‖hash(R) with and by a signature key s private to the ticket provider, and (v) Sign(s,I‖hash (R))‖R is the appending of R to this digitally signed encryption.

In greater detail, the origin of each of these mathematical quantities that are within the digital ticket may be ascribed to either (i) the computer of the ticket provider, or (ii) the computer of the ticket producer. The digital ticket procured by a ticket consumer upon a communication network from and by interaction with a ticket provider is always embodied in a tangible transportable data storage medium containing Sign(s,I‖hash(R))‖R. However, and in detail, the sequence of how this number came to be within the digital ticket consists of several steps.

First, R is a number having its origin in a computer of the ticket consumer.

Second, so does the a one-way function of R—the calculated hash of R—or hash (R), have its origin in a computer of the ticket consumer.

Third, this number hash(R) is appended to event (or other ticket) information I in the computer of the ticket provider.

Fourth, this computer of the ticket provider also calculates a signed digital encryption, based on digital signature key s, of the appended numbers, i.e., Sign(s,I‖hash(R)).

Fifth, the computer of the ticket consumer appends the number R to this signed digital encryption Sign(s,I‖hash(R)), producing Sign(s,I‖hash(R))‖R.

The number R, having its origin in a computer of the ticket consumer, is private to the ticket consumer, and is not public.

The digital signature key s of the computer of the ticket provider is private to the ticket provider, and is not public.

5. Simplified Recapitulation of the Present Invention—Part 1

The present invention is not unduly complex; the preceding sections 2–4 are not particularly long. The mathematically-based steps of the method of the invention—which may now warrant review—went quickly in section 2. However, by this point in the explanation, the reader—although likely willing to accede that the invention apparently entails certain precise, mathematically-based, steps—may effectively be "lost in the forest for the trees", and may be failing to grasp just exactly why the method, first time—the random number, which number is in clear text. Detaching this random number, the gate-keeper's computer then uses its knowledge of a digital verification key (v in the preceding sections) to the encrypted signature of the ticket producer's computer, and recovers the one-way hash function.

If the ticket was legitimate, the signed data will have been decrypted successfully. The gate keeper's computer then has (i) the random number and (ii) the one-way hash function of the random number. What should it do? Why it simply re-calculates the one-way hash function on the random number and compares it to the one already at hand! If both has functions are equal then the digital ticket is good.

Approaching analysis and explanation this way, a first thing that is discernable is that, during process of generation of the digital ticket, each party lacks certain information of the other party, which information is either hidden behind a one-way transformation or by encryption. Consequently—and although more important to cheating by the buyer—the ability of either party to cheat and to supplant or pervert the processes of the other is limited.

Interestingly, a buyer has more recourse against a cheating seller than simply to complain, and withhold future patronage. The verification key v of the ticket seller's digital signature is generally publicly known. It is thus possible for a buyer to prove that he/she is in possession of a legitimate article. Although of only modest importance for attendance at events, the "dual accountability" of the present invention is of greater importance to other secured transactions such as, inter alia, money orders.

6. Simplified Recapitulation of the Present Invention—Part 2

The present invention is broader than the details of its implementation.

For example, the random number R must not be perceived of as necessarily being solely, or only, a random number. It may incorporate, or be combined with, information on any of (i) the ticket consumer, (ii) the date, location and/or name of the event(s) or other entitlements for which the ticket is being purchased, (iii) the price of the ticket, and (iv) still other data. The essential concept is only that the net number R is random, and not subject to being guessed including by the ticket provider.

Likewise by way of example, the one way hash function hash(R) need not be a simple mathematical hashing function but can also itself be, by way of example, encryption. Encryption can, after all, be considered the ultimate form of hashing.

How, then, should the present invention, and the claims of this specification directed to the present invention, be understood once it is realized that, as stated, the idea of the present invention is broader than merely the preferred implementation strategy? Having assimilated the previous sections 1 and 4, still yet another way to think about, and understand, the nature of the present invention is to consider the final digital ticket Sign(s,I∥hash(R))∥R and then "disassemble" this digital ticket, peeling off its layers as if it were an onion and expressing in words (as well as mathematics) exactly what the digital ticket consists of.

The first thing that may be said is that the digital ticket contains something—a random number R—that is in clear text (or that if, in some variant of the present invention, encrypted, may be immediately reduced to clear text by application of the cryptographic key of the presenter). This something—this R—arose with the ticket consumer. However, most typically quite a long time normally elapses before this clear text quantity R first ultimately becomes known to the ticket provider, which normally occurs only upon presentment of the digital ticket at the event for which the ticket is held. The ticket consumer so conceals the random number R from the ticket seller, and the world, by use of a one-way function, hash(R).

Next the digital ticket contains something else: information I regarding at least the event for which the ticket is held which information I is, subject to being guessed, and not secure. The security of the digital ticket resides in the digital signature, using a private signature key s, of both the hash(R) and the I, in the quantity Sign(s,I∥hash(R)). Although this quantity may commonly be decrypted to plain text by anyone using the typically public key v, it cannot be made but with knowledge of the signature key s, which is private. Therefore, only the ticket seller can make the final precursor to the digital ticket itself.

The gate keeper is in privity with the ticket provider. If the digital signature is made with a public key algorithm, such as with the RSA algorithm, then the gate keeper is able to decrypt the signed quantity by use of the public key without being able to sign this quantity in the first place. In other words, a gate keeper need not perform the function of, nor rise to the level of, a ticket provider.

Note that when the verification key of the ticket producer is public, as is preferred, then anyone can recover the quantity that was signed, or the ticket information I and the hash(R). The validity of the ticket for resale by the original purchaser, as well as for ultimate redemption, may thus be quite readily determined. Of course, possession of the data quantities I and hash(R) that are within the ticket does nothing towards producing either R or Sign(s,I∥hash(R)). Recall that the hash(R) is a one-way function that (i) originated with the ticket consumer, (ii) was "wrapped up" in a digital signature by the ticket provider, and (iii) was carried around by the ticket consumer within the digital ticket.

Note also that the gate keeper computer need not reverse the hash(R) to find the seed—the R. Indeed, upon tender of the digital ticket is given this seed—this R. The gate keeper computer simply uses the seed—the R—to perform the one-way function all over again—producing the hash(R) anew. The (i) one-way function recalculated is compared to the (ii) one way function decrypted to assess the validity/invalidity of the digital ticket.

Thus a digital ticket in accordance with the present invention is embodied in a tangible transportable data storage medium. The medium contains first-type data—originally known both to a buyer and to a seller of a ticket and meaningful to at least the seller of the ticket—to identify both the buyer of ticket and a particular event for which the ticket was sold. This first-type data may be of the nature of an index by which the ticket seller may so identify the buyer of the ticket only relatively, and out of many ticket buyers, and not absolutely, as by name. This first-type data normally, however, permits the ticket seller to identity absolutely the particular event and time for which the ticket.

More importantly, the medium also second-type data including a digitally signed quantity that was originally computer-generated in sequence (i) at a first time first by the buyer of the ticket as a non-invertible function of a random number called the "first-time-made non-invertible function", and then (ii) at a second time by the seller of the ticket as a digital signature of the first-time-made non-invertible function, and then (iii) at a third time third by the buyer of the ticket who attaches the selfsame random number. Herein these included sequential steps (i)–(iii) is the essence of the digital ticket of the present invention.

A digital ticket so constructed is validated upon attempted redemption of the ticket in steps. First the random number is detached. Then the signed first-time-made non-invertible function is decrypted, recovering the first-time-made non-invertible function. Then the non-invertible function of that selfsame random number just detached is made all over again. This newly-made non-invertible function is called the "second-time-made non-invertible function".

If (i) the second-time-made non-invertible function equals the first-time-made non-invertible function and (ii) the "signed data" is verified and decrypted successfully, then the ticket is valid. If the second-time-made non-invertible function does not equal the first-time-made non-invertible function, or it the digital signature of the ticket cannot be verified, then the ticket is invalid—at least for the particular event.

These and other aspects and attributes of the present invention will become increasingly clear upon reference to the following drawings and accompanying specification.

BRIEF DESCRIPTION OF THE DRAWINGS

FIG. 4 is a prior art table 1 showing properties of specific types of exemplary tickets all of which tickets may suitably be realized by the digital ticket in accordance with the present invention previously seen in FIGS. 1–3.

DESCRIPTION OF THE PREFERRED EMBODIMENT

Figure 1:
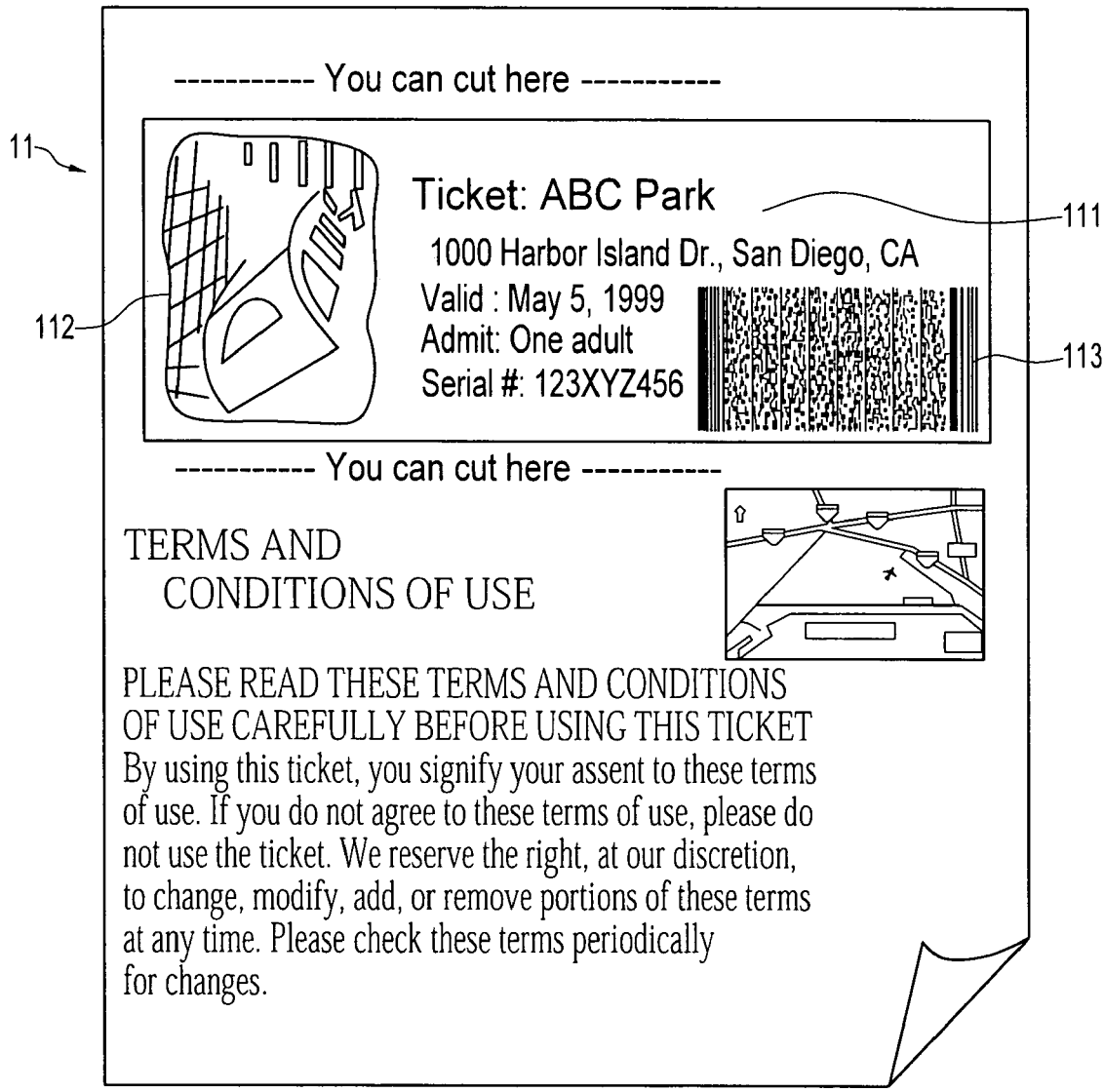
FIG. 1 is a view showing a first, printed paper, embodiment of a digital ticket in accordance with the present invention.

In the following section 1 the basic embodiments, and terminology, of the present invention are explained. In section 2 the design of the Internet-based digital ticketing scheme of the present invention is set forth in detail. In section 3 several related ticketing schemes are discussed, and compared with the technical merits of the method of the present invention. Finally, section 4 concludes with some remarks about enhancements to the digital tickets, and digital ticketing scheme, of the present invention.

1. Basic Embodiments, and Terminology

There are two major embodiments of the present invention: (1) a printed embodiment 11 (shown in FIG. 1)

requiring only the commonly available (personal) computer peripheral of a printer to fix in a tangible medium (i.e., to print on paper) and (ii) an electronic embodiment (shown in FIGS. 2 and 3), fixed in the tangible medium of a flexible disk 12 or a CD/ROM or a DVD 13 or a smart card or equivalent by a writer of these forms of digital memory.

Additionally in this specification, one, first, party to the digital ticket is variously called a producer, a provider, a seller, a server, or combinations of these terms as the matter under discussion then warrants. This selfsame party, or some party(ies) allied to this party, may also be called a ticket collector, or a gate keeper.

Meanwhile the other, second, party to the digital ticket is variously called a purchaser, a consumer, a client, a buyer, or combinations of these terms. This selfsame party, or some party(ies) holding the digital ticket from this party, may also be called a ticket redeemer, or a party that tenders the ticket.

Curiously, and by convention, the first party is also sometimes called the "generator" of the digital ticket although it is the second party that prints the digital ticket, or otherwise reduces it to a tangible medium of impression and storage.

It would have been a simple matter in this specification to word process all the different terms by which each party is called into but one, or at most two, different terms or description per party. However, it has been found that doing so detracts from understanding both the context in which a party is acting, and the subtleties of the invention. Accordingly, the large number of alternative names are preserved.

2. Paper-based Digital Tickets

The present invention leverages considerable existing Internet technology to achieve an easy-to-use solution.

First, it is assumed that the consumer has access to and trusts an SSL-capable browser for establishing encrypted and authenticated connections to merchant/ticketing servers. Additionally, for the preferred first, printed, embodiment of the digital ticket 11 shown in FIG. 1, it is assumed that the consumer user has access to a printer. (Similarly, for the second, flexible disk, embodiment of the digital ticket 12 shown in FIG. 2, the consumer user must have a magnetic flexible disk drive; and for the third, CD-ROM, embodiment of the digital ticket 13 shown in FIG. 3, the consumer user must have a writable CD-ROM drive.)

The consumer uses his/her browser to connect to the ticketing service's web server, and purchase the ticket(s) using a standard payment mechanism such as a credit-card transaction. The ticketing server delivers the ticket to the consumer's browser organized, most preferably, in the form of a 2-D bar-code (and, optionally, some accompanying text), which is then printed. The consumer need not arrive at the event early to pick up tickets; instead, the printed 2-D bar coded digital ticket 11 is simply presented to the ticket taker, who verifies it with a laser scanner.

The digital data encoded in the 2-D bar code 14 is central to the ticketing mechanism. Like as in the generation of digital postage indicia, or "e-stamps", in the present invention the server generates an encrypted digital signature that is part of the ticket data. Unlike the generation of postage indicia, however, the scheme of the present invention provides the additional assurance that even if the ticketing server is compromised, the consumer's ticket cannot be stolen by attackers and the legitimate consumer framed for duplicate redemption. The ticket issuance protocol is as follows:

(1) The ticketing server and consumer agree on ticket information I. This information species the time and place of the venue, etc, and typically includes a ticket serial number.

(2) The consumer's browser (via a downloaded Java program or a plug-in used with the browser) generates a random number R, and sends hash(R) to the server. Here hash(•) is a non-invertible function, meaning that determination of (•) from hash(•) may be, with powerful computers working long periods, computationally possible. However, determination of (•) from hash(•) is definitely computationally impractical and infeasible, meaning that any attempt to do so would greatly exceed both the cost of the ticket and the time remaining until the entitlement which the ticket secures, typically by many orders of magnitude, that this alternative is not realistic.

Additionally, and further, the hash(•) is preferably a collision-resistant hash function, meaning that the hash($R_1$) of a number $R_1$ will not be close to the hash($R_2$) of a number $R_2$ even R is very close, even just one away, from the number $R_2$. The mathematical functions SHA1 and MD5 are in particular suitable, and preferred. The utility of this preferred collision-resistance—which utility goes to a false claim of dual redemption by the ticket seller—will be discussed below. For the moment, however, it must not be prematurely presumed that the security of the digital ticket lies in the computational difficulty of reversing the hash(R) function. In fact, this only protects the sanctity of the final digital ticket from the seller thereof, who is supposed to be honest anyhow.

(3) The ticket server/seller (i) appends some information I, (ii) signs the received hash(R) and appended information I using a digital signature key s as Sign(s,I‖hash(R)), and (iii) sends this signed data quantity back to the consumer. (Here we assume that x may be recovered from the signature Sign(x) by a party having knowledge of the appropriate decryption algorithm and/or key from the ticket server/seller. The verification key v, and sometimes also the algorithm, corresponding to the signature key s are normally public. However, neither the ticket consumer/user nor anyone other than the ticket seller has the means of producing the digitally signed quantity Sign(s,I‖hash(R)).)

(4) The consumer/user can, however, add, or attach, something to the encrypted quantity, and this the consumer/user does, attaching the same R that was the basis of the hash(R). (Remember, the ticket server/seller has never been informed of this R, and could not send it back even if it wanted to do so.) The quantity Sign(s,I‖hash(R))‖R becomes the logical digital ticket.

The browser of the consumer/user preferably encodes this value as a 2-D bar-code, which is then printed on normal printer paper. This is the physical ticket that the consumer/user must take to the gate.

The requirement that hash(•) is not only non-invertible but also collision resistant implies a subtle property. Non-invertible implies that the ticket server is unable to falsely redeem a valid ticket (and thus frame the user). Collision resistance provides the additional assurance that the only way that a duplicate redemption can occur is if the user (intentionally or accidentally) leaked the pre-image value R.

Ticket redemption simply involves scanning the 2-D bar code, verifying the signature, checking the information I is for the particular event for which the ticket 11 is tendered, and checking that the encoded R value is indeed the pre-image of the signed hash value. Additionally, the value R is logged as evidence that the ticket 11 has been canceled or redeemed.

An exemplary paper-based digital ticket 11 is shown in FIG. 1. Plain text information 111 and imagery 112 are normally specific to the entitlement, such as an admission to an event, to which the digital ticket is directed. However, this need not invariably be so, and digital tickets can be made without overt reference to what they are for a "secret passes". Indeed, to deter theft, the legitimate holder of a legitimate ticket to, by way of example, a football game may chose not to have any text or imagery appear on the digital ticket. Lack thereof in no way interferes with ticket redemption.

The paper-based digital ticket 11 further presents a region 113 where is contained the information of the ticket. This also may be in plain text, as would be read and recognized by an optical character reader (OCR). Preferably this information is in the form of a bar code, and more preferably a two-dimensional bar code, as illustrated. The printed two-dimensional bar code is still more preferably in accordance with either the PDF417 or QR standards.

A limitation of this scheme is that due to the requirement that tickets are transported to the gate on paper, the redemption protocol must consist of a single message. Since any verification information (such as the R of the present invention) is revealed in a single step, there is nothing to prevent the ticket scanner from falsely claiming that the ticket was redeemed earlier. If the ticket is stored within a smart card, however, an interactive protocol is feasible. Using an interactive protocol has the following benefit: the ticket scanner may be prevented from making such a false claim of earlier ticket redemption. This is examined next.

2.1 Disk and Smart Card-based Digital Tickets

Figure 2:
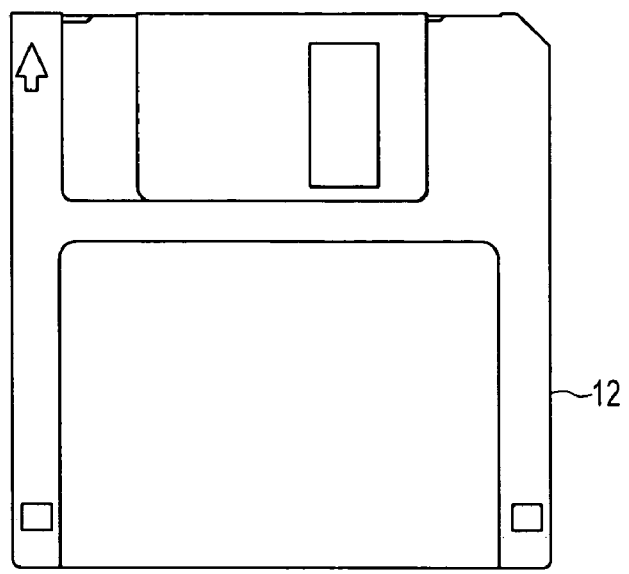
FIG. 2 is a view showing a second, flexible disk, embodiment of a digital ticket in accordance with the present invention.
Figure 3:
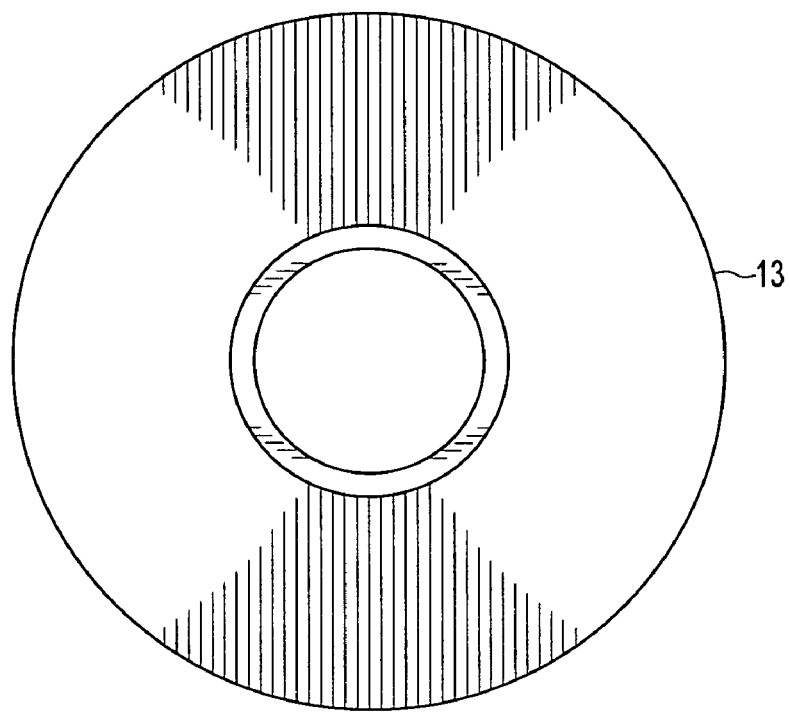
FIG. 3 is a view showing a third, CD-ROM, embodiment of a digital ticket in accordance with the present invention.

The same information that is held within the printed embodiment of the digital ticket 11 of the present invention shown in FIG. 1, and more, may readily be held within embodiments such as the flexible disk 12 shown in FIG. 2. This flexible disk 12 will be understood to be roughly commensurate in size, volume and area with numerous other types of transportable magnetic and optical storage media including CD-ROMs and DVDs 13 (FIG. 3), and smart cards (not shown). Despite being claimed, these well-known physical forms are not all individually illustrated, as is the flexible disk 12 of FIG. 2, because such illustrations add veritably nothing to the understanding of the present invention. A most interesting form from a functional perspective is the smart card (not shown).

By using smart cards as digital ticket containers, ticket-scanner framing prevention is achieved in the following way.

The browser is required to generate a vector of random values $R_0, R_1, \ldots, R_{n-1}$ and send the hashes $h(R_0), h(R_1), \ldots, h(R_{n-1})$ to the ticket server. The ticket server generates the signature $Sign(I\|h(R_0)\|h(R_1)\| \ldots \|h(R_{r-1}))$ The ticket redemption protocol works as follows:

(1) The ticket scanner generates a random subset $C \subset Z_n$ such that $|C|=n/2$.

(2) The scanner, using a scanner-specific signature key, commits to the challenge selection by generating the signature $(C)_s$ and sending it to the smart card.

(3) The smart card verifies the signature Sign(C) and that C contains exactly n/2 unique elements. It then reveals $\forall_i \forall C: R_i$ to the ticket scanner.

In this protocol, because only half of the random pre-images are revealed, having a record containing more than half of the pre-images is non-refutable evidence of double redemption.

Unlike Chaum's cut-and-choose protocol for electronic money, the present invention does not require encoding of identity information—consumers must be physically present to redeem tickets. See David Chaum, Amos Fiat, and Moni Naor; Untraceable electronic cash; in *Advances in Cryptology—Crypto '88*, pages 200–212.; Springer-Verlag, 1990. (This design decision must be revisited if the digital tickets of the present invention are to be used for events or entitlements where physical presence is not required.)

Because the hash function is collision resistant (and thus second-pre-image resistant), the ticket-scanner (or the ticket issuer) cannot frame the consumer for double redemption; the scanner's commitment of the challenge set C allows the smart card to show that it was in the middle of the ticket redemption protocol—and continue from where it left off—if the protocol is somehow interrupted.

2. Related Systems

There are several related systems for Internet-assisted ticketing and related uses such as coupon generation. These systems are discussed, and compared with the scheme of the present invention, in this section 2.

2.1 Shared Authentication Codes

There are several ways to provide ticketing-like services. One of the simplest methods—already employed on the Internet and for telephone transactions uses a secret authentication code as a "reservation number." These secret codes are either memorized or written down, and typically serve only to uniquely identify the reservation entry in the merchant database: when the customer arrives, the original credit card and picture ID are required to check into the hotel or to pick up the physical tickets. One might, of course, imagine the use of these codes where the consumers key in the codes to operate an automatic gate.

While such codes are network deliverable, they are difficult to use. For tickets to a venue with a large audience, unless the codes are long, the fraction of all codes that would be valid could be unacceptably large. And when the codes are long, users find them difficult to memorize or key in properly.

2.2 ETM

An existing ticketing system is ETM (http://www.etm.com/) ETM is kiosk-based: consumers go to a kiosk, typically located in a grocery store or other frequently visited locations, and purchase tickets by using a credit card. The tickets are printed on special paper: the assumption is that access to the paper is controlled, and the paper is incapable of being forged, much as airline ticket card-stock is similarly controlled. In addition to direct purchases, ETM also permits purchase over the Internet by visiting its website: a credit card transaction results in an authorization code which may be used at a kiosk (perhaps in addition to presenting the credit card) to obtain a ticket. This Internet "purchase" is in effect more a way to reserve a ticket than an actual ticket purchase.

2.3 E-Ticket

An agent called E-Ticket, http://www.e-ticket.net/, already sells event tickets in Japan which can be received on the Internet. Their ticket consists of a data image, and the purchasers save it on a flexible disk. The ticket seller arranges an exclusive booth for redemption of tickets at the event site, examining electronic tickets stored in the flexible disk using a small computer, and then either exchanging the electronic ticket for a paper ticket or simply letting the ticket bearer into the venue via an exclusive gate.

Since the ticket transfer medium is a flexible disk, read errors sometimes occur. In order to eliminate these problems, E-ticket has announced plans to replace the ticket transfer media with ID tags (contact-less smart cards). These electronic tickets are easy to copy; as a deterrent, E-ticket requires membership registration, including name and credit card number information.

2.4 E-Coupon

A coupon is a ticket to a discount. Some agents already distribute such a coupon from web sites on the Internet. Internet Coupon Service, "http://www.e-coupon.com/", distributes coupons that can be used at certain shops and Liberty Production, "http://www.autoshowusa.com/", distributing coupons which can be used for, by way of example, the International Auto Show from their web sites.

According to the instruction on the web page, users make coupons come up on the screen and they print the coupons. Consequently, users will bring the printed coupons and will take some discount advantage at the shops or event sites. A coupon is a kind of sales promotion strategies; therefore, these is no particular consideration against forgeries.

2.5 Electronic Checks

Electronic checks are like tickets and coupons in that they encode a single-use right. See B. Clifford Neuman and Gennady Medvinsky; Requirements for network payment: The netcheque perspective; in *Proceedings of IEEE COMPCON'95*, March 1995. Here, the capability is the right to transfer money from the check writer's checking account to the recipient's own account. Because there exists a vast clearance infrastructure for physical checks, Neuman and Medvinsky proposed to use this infrastructure to aid in the clearance of electronic checks. No such clearance infrastructure is available nor necessary for electronic tickets.

2.6 Ticket Data

Fujimura and Nakajima examined the data encoding requirements for electronic tickets and coupons. They proposed the use of XML to encode the data, and provided a list of ticket properties which must be present. This work is orthogonal to the present invention, and the two may be used in combination. See the Background of the Invention section of this specification.

3. A Compatible Hashing Function

Neither the efficacy, nor the security, of the present invention is based on the random number selection, nor the hashing function, performed in the computer of the ticket buyer. It will be recalled that the principle reason the hashing ensued was to guard the buyer against an unscrupulous ticket seller who was (digitally) selling the same ticket twice.

However, it is possible to use a particular new scheme for the hashing, which scheme is the subject of the related U.S. patent application Ser. No. 09/020,461 filed Feb. 9, 1998, for a PROBABILISTIC SIGNATURE SCHEME.

The object of the invention of the related application is to provide new signature schemes that are as simple and efficient as standardized ones. Assuming the underlying hash function is ideal, the inventive methods of the related application are not only provably secure, but provably secure in a strong sense. In one embodiment involving RSA, signing takes one RSA decryption plus some hashing, verification takes one RSA encryption plus some hashing, and the size of the signature is the size of the modulus. The security of the scheme of the invention of the related application in this embodiment is allegedly tightly related to the security of the RSA function itself. The teachings of the related application are also extended to provide schemes for Rabin signatures with analogous properties; in particular, their security can be tightly related to the hardness of factoring.

This particular new scheme for hashing—which scheme is the subject of said related U.S. patent application Ser. No. 09/020,461 filed Feb. 9, 1998, for a PROBABILISTIC SIGNATURE SCHEME—is suitable for use in the system of the present invention. In particular, it is known to hash a message N onto the full domain $Z_N^*$ of the RSA function before decrypting. The signature of M is $f^{-1}(h(M))$, where h is constructed to spread its argument uniformly into $Z_N^*$. According to the related application, such a known technique is strengthened by making the hashing probabilistic. In order to sign message M, the signer first picks a random seed r of length $k_0$ where $k_0 < k$ is a parameter of the scheme (recall $k = |N|$). Then, using some hashing, in a specific way, the signer produces from M and r an image point $y = \text{Hash}_{PSS}(r, M) \in Z_N^*$. As usual, the signature is then $x = f^{-1}(y) = y^d \mod N$. Verification is more difficult, because one cannot simple re-compute a probabilistic hash of M and expect to get the same value. Still, verification takes only one RSA encryption and some hashing.

The scheme of the related application is alleged to be as efficient as known signing schemes based on RSA. Moreover, it is further alleged, as previously stated, that the security of the hashing scheme of the related application is tightly related to the security of the RSA algorithm itself. Thus, for example, if the RSA inversion probability was originally $2^{-61}$ (using a certain amount of computational resources), then the probability of forgery for the signature scheme is almost equally low (assuming the same computational resources).

According to the a related application, signing with "message recovery" is also provided. This technique reduces the bandwidth required for sending a signed message. In this technique, rather than transmit the message M and its signature x, a single enhanced signature $\tau$, of length less than $|M|+|x|$, is transmitted. The verifier is able to recover M from $\tau$ and simultaneously check the authenticity. With security parameter $k=1024$, the inventive scheme enables one to authenticate a message of up to, say, $n=767$ bits by transmitting only a total of k bits. The signing with message recovery scheme accomplishes this by appropriately folding the message into the signature in such a way that the verifier can recover it. The computational efficiency and security are the same as for the first-described scheme.

Thus, in one of its aspects the related application concerns a method of signing a data string. The method proceeds stepwise by (a) hashing the data string and a seed value to generate a s hash value, (b) encoding into an image point the hash value, the seed value, and a given portion of the data string, and (c) applying a given decryption primitive to the image point to obtain a digital signature of the data string.

In another of its aspects the related application concerns a computer-implemented method of signing and authenticating a data string K having a first portion $M_1$ and a second portion $M_2$, wherein the data string is recoverable from $M_1$ and $M_2$. The method includes steps of (a) hashing the data string and a random seed r to generate a hash value $h(r,M)$, (b) encoding into an image point y the hash value $h(r,M)$, the random seed r, and the second portion $M_2$ of the data string, (c) applying a decryption primitive to the image point y to obtain a digital signature x of the data string, and (d) associating the digital signature x with the first portion $M_1$ of the data string.

Thus this RSA-based signing scheme combines essentially optimal efficiency with attractive security properties. In the scheme one preferred signing routine requires one RSA decryption plus some hashing, verifications requires one RSA encryption plus some hashing, and the size of the signature preferably is the size of the modulus. Given an ideal underlying hash function, the scheme is not only provably secure, but has security tightly related to the security of RSA. An alternative embodiment maintains all of the above features and, in addition, provides message recovery. The techniques can be extended to provide schemes for Rabin-based signatures or signatures using other trapdoor functions.

The technique is suitable for use with the present invention. However, the system and method of digital ticketing of the present invention certainly requires no such advanced hashing and signing technique. The hashing and signing technique of the related invention is mentioned primarily as being illustrative that the present invention may fully couple the extreme power, and most advanced present frontier, of cryptography. It will be understood by a practitioner of the cryptographic arts that although the present invention may be embodied in but a small printed area on inexpensive paper, the sophistication and the security of the information so presented may be very great. The level of security— cryptoanalytical security and otherwise—commonly invoked in real-world usage of the system and method of the present invention is not just that as would suitably protect the value of a single ticket—perhaps $100 U.SD. circa 2000—but rather as would protect the value of all tickets sold to an event—which might commonly be tens of millions of dollars U.S. for major sporting events.

The contents of the related application are incorporated by reference, and to such extent as access thereto should become required by issuance of any patent on the present application, such access is granted by the common assignee of both the present and related application, the Regents of the University of California.

4. CONCLUSION

In accordance with the present invention, schemes whereby tickets may be purchased and delivered on the Internet have been taught. The inventors believe that these schemes are practical and strike a good balance between security and consumer acceptability/ease of use. For example, a digital ticket in accordance with the present invention satisfies all the requirements of all the diverse ticket types listed in the prior art Table 1 of FIG. 4, which Table 1 is derived from the article "XML Ticket; Generalized Ticket Definition Language" by K. Fujimura, Y. Nakajima and J. Sekine appearing (circa 1999) on the world wide web at http://www.w3.org/Dsig/signed-XML99/pp/NT-T_xml_ticket.html.

In accordance with the preceding explanation, variations and adaptations of the digital ticket, and digital ticketing, in accordance with the present invention will suggest themselves to a practitioner of the communications system design and/or cryptographic system design arts.

For example, additional information both meaningful and extraneous can be attached to the digital ticket by the producer, by the purchaser, and even by the gate keeper. The fact the more, other or different information, both coded and un-coded, comes to appear on the digital ticket should not become a basis for obfuscation of the essential principles of the present invention, as hereinafter claimed.

For example, many different digital signature algorithms, both private and public key, are suitable for use in the digital ticket of the present invention.

Likewise by way of example, it is not essential that the ticket be printed small, or hand contained within a storage media. A digital ticket for travel upon a toll highway might be printed at 8½"×11" size, and affixed to an automobile window for reading by a laser beam at a non-stop drive-through highway-access toll station. Alternatively, the digital ticket might be loaded into a radio transponder likewise interrogated at attempted entrance of the car onto the toll highway.

Still furthermore, and as has already been explained, the digital ticket can itself be alternatively called electronic money, an electronic ticket, an electronic coupon, a license or a pass without detracting from its essential characteristics.

In accordance with these and other possible variations and adaptations of the present invention, the scope of the invention should be determined in accordance with the following claims, only, and not solely in accordance with that embodiment within which the invention has been taught.

What is claimed is:

1. A computerized method for delivering a digital ticket from a ticket provider to a ticket consumer across a communications channel, the method comprising:

first communicating, across a communications channel from a computer of a ticket provider to a computer of the ticket consumer, first digital data $D_1$ in respect of an occurrence relating to the ticket; and second communicating, across the communications channel from the computer of the ticket consumer to the computer of the ticket provider, second digital data $D_2$ relating to purchase of the ticket; and calculating in the computer of the ticket provider by use of a private key s a digital signature of third digital data $D_3$, which third digital data $D_3$ is in respect of one or both of the first digital data $D_1$ and the second digital data $D_2$, and which digital signature of the digital data $D_3$ is as well, being a proof both (i) that a private signature key s was used by the computer of the ticket provider in generation of the digital signature and (ii) that one or both of the digital data $D_1$, $D_2$ was used in respect of its generation, (iii) suitably stored in a transportable storage medium; and wherein the digital data $D_1$, $D_2$ in respect of which the digital signature of digital data $D_3$ was generated becomes a memorialization of a particular provision by the ticket provider of the particular digital ticket for the particular occurrence to the ticket consumer who is particularly identified at least as a party at the other end of the communicating transpiring across the communications channel; and third communicating, across the communications channel from the computer of the ticket provider to the computer of the ticket consumer, at least the signed digital data $D_3$; and first storing with the computer of the ticket consumer in the transportable storage medium at least the signed digital data $D_3$, thus turning the transportable storage medium into a digital ticket; and physically transporting the digital ticket in the form of the transportable storage medium so containing at least the signed digital data $D_3$, to a specific place for the occurrence relating to the ticket; and tendering the digital ticket for redemption to a ticket taker at the specific place; and reading into a computer of the ticket taker at least the signed digital data $D_3$; and recovering in the computer of the ticket taker, with a digital verification key v corresponding to the signature key s of the ticket provider and from the signed digital data $D_3$, the digital data $D_3$; and determining in the computer of the ticket taker IF the digital data $D_3$ was recoverable by verification key v AND, having been so recovered, the digital data $D_3$ correctly memorializes the particular provision by the ticket provider of the particular third digital data $D_3$ for the particular occurrence to the particular ticket consumer who at one time communicated across the communications channel THEN the digital ticket is valid, ELSE IF the digital data $D_3$ was recovered by use of the verification key v BUT the digital data $D_3$ recovered incorrectly memorializes the particular provision by the ticket provider of the particular third digital data $D_3$ for the particular occurrence to the particular ticket consumer who at one time communicated across the communications channel THEN the digital ticket is invalid;

wherein the second communicating is of second digital data $D_2$ including a one-way function hash (R) of a number R which number R is uniquely known to the computer of the ticket consumer and not to the computer of the ticket provider.

2. The digital ticket computerized delivery and redemption method according to claim 1 wherein the calculating in the computer of the ticket provider is of a digital signature in respect of the third digital data $D_3$ including the one way function of hash (R) plus information I concerning the event for which the ticket is had, Sign (s, I∥hash (R));

wherein the third communicating is of Sign (s, I∥hash (R));

wherein the first storing is of R appended to Sign (s, I∥hash (R)), or Sign (s, I∥hash (R))∥R, as the digital ticket;

wherein the reading into the computer of the ticket taker is of the Sign (s, I∥hash (R))∥R;

wherein the recovering in the computer of the ticket taker of the I∥hash (R) gives hash (R); and, having both R and hash (R) to hand, wherein the determining further proceeds by recalculating the hash (R) in respect of R, so that IF the recalculated hash (R) equals to the recovered hash (R) of the digital ticket as read THEN the digital ticket is valid ELSE IF the hash (R) does not equal to the recovered hash (R) of the digital ticket as read THEN the digital ticket is invalid.

3. The digital ticket computerized delivery and redemption method according to claim 2 wherein the determining still further proceeds so that IF the read digital ticket is the first uniquely presented THEN the digital ticket is valid ELSE IF the read digital ticket is not the first uniquely presented THEN the digital ticket is invalid.

4. The digital ticket computerized delivery and redemption method according to claim 2 wherein the second communicating is of a one-way hash function hash (R) of a number R;

wherein the calculating in the computer of the ticket provider is of a digital signature in respect of signature key s of both the hash (R) plus information I concerning the event for which the ticket is had, Sign (s, I∥hash(R));

wherein the third communicating is of Sign (s, I∥hash (R));

wherein the first storing is of R appended to Sign (s, I∥hash (R)), or Sign (s, I∥hash (R))∥R, as the digital ticket;

wherein the reading into the computer of the ticket taker is of the Sign (s, I∥hash (R))∥R;

wherein the recovering in the computer of the ticket taker of the I∥hash (R) gives hash (R); and, having both R and hash (R) to hand, wherein the determining further proceeds by recalculating the hash (R) in respect of R, so that IF the recalculated hash (R) equals to the recovered hash (R) of the digital ticket as read THEN the digital ticket is valid ELSE IF the hash (R) does not equal to the recovered hash (R) of the digital ticket as read THEN the digital ticket is invalid.

5. The digital ticket computerized delivery and redemption method according to claim 4 wherein the determining still further proceeds so that IF the read digital ticket is the first uniquely presented THEN the digital ticket is valid ELSE IF the read digital ticket is not the first uniquely presented THEN the digital ticket is invalid.

6. The digital ticket computerized delivery and redemption method according to claim 1 wherein the calculating is of digital signature suitably displayed as a 2-D code; and wherein the first storing with the computer of the ticket consumer is by printing of the 2-D code upon a printable transportable storage medium.

7. The digital ticket computerized delivery and redemption method according to claim 6 wherein the reading into a computer of the ticket taker of the digital signature transpires by use of an optical reader.

8. A computerized method for delivery of a ticket from a ticket provider to a ticket consumer across a communications channel, the method comprising:

first transmitting, across a communications channel from a computer of a ticket provider to a computer of a ticket consumer, data regarding an event relating to the ticket;

first calculating in the computer of the ticket consumer a number R; then second calculating in the computer of the ticket consumer a one-way function of the number R as hash (R);

second transmitting, across the communications channel from the computer of the ticket consumer to the computer of the ticket provider, at least the hash (R) as ticket order data;

third calculating in the computer of the ticket provider in respect of signature key s a digital signature of hash (R) appended to information I regarding the event as Sign (s, I∥hash (R)), this Sign (s, I∥hash (R)) constituting a digital ticket precursor; then third transmitting, across the communications channel from the computer of the ticket provider to the computer of the ticket consumer, the digital ticket precursor Sign (s, I∥hash (R));

fourth calculating, in the computer of the ticket consumer as an appending of R to the digital ticket precursor Sign (s, I∥hash (R)), Sign (s, I∥hash (R))∥R, as a digital ticket;

first storing the digital ticket Sign (s, I∥hash (R))∥R from the computer of the ticket consumer to a transportable storage medium.

9. The method according to claim 8 expanded and extended to use of the digital ticket by the ticket consumer at the particular event, the method, after the first storing, further comprising:

transporting the transportable storage medium within which the digital ticket Sign (s, I∥hash (R))∥R is written to the particular event;

tendering the digital ticket within the transportable storage medium for verification and for admission to the particular event;

reading the digital ticket Sign (s, I∥hash (R))∥R to an event computer;

extracting in the event computer the number R from the read Sign (s, I∥hash (R))∥R;

fifth calculating, by use of a verification key v complimentary to the signature key s, I∥hash (R); plus sixth calculating in the event computer, with the same one-way function previously used in the second calculating, hash (R); and then, having both R and sixth-calculated hash (R) to hand, comparing the sixth-calculated hash (R) to the hash (R) portion of the fifth-calculated I∥hash (R);

wherein IF the fifth-calculating proceeds correctly AND the information I is correct for the event AND the sixth-calculated hash (R) compares to the fifth-calculated hash (R) of the digital ticket as read THEN grant admission to a holder of the digital ticket ELSE IF the fifth-calculating proceeds incorrectly OR the information I is incorrect for the event OR the sixth-calculated hash (R) fails to compares to the fifth-calculated hash (R) of the digital ticket as read THEN deny admission to the holder of the digital ticket.

10. The method according to claim 9 wherein IF the fifth-calculating proceeds correctly AND the information I is correct for the event AND the sixth-calculated hash (R) compares to the fifth-calculated hash (R) of the digital ticket as read AND the read digital ticket is the first uniquely presented THEN grant admission to a holder of the digital ticket ELSE IF the fifth-calculating proceeds incorrectly OR the information I is incorrect for the event OR the sixth-calculated hash (R) fails to compares to the fifth-calculated hash (R) of the digital ticket as read OR the read digital ticket is not the first uniquely presented THEN deny admission to the holder of the digital ticket.

11. The method according to claim 9 that, between the extracting and the fifth calculating, further comprises:

second storing R in the event computer as an indication that the digital ticket has been tendered.

12. The method according to claim 8 where the ticket provider is also a ticket seller, the ticket consumer is also a ticket buyer, and the delivery of the ticket to the ticket consumer across the communications channel accompanies a sale of the ticket:

wherein the second transmitting further includes electronic payment suitable to the order data.

13. The method according to claim 8 wherein the first transmitting, the second transmitting and the third transmitting are upon a worldwide communications network.

14. The method according to claim 8 wherein the first transmitting, the second transmitting and the third transmitting are upon a worldwide secure or encrypted communications network.

15. The method according to claim 14 wherein the first transmitting, the second transmitting and the third transmitting are upon the Internet.

16. The method according to claim 15 wherein the first transmitting, the second transmitting and the third transmitting are upon the Secure Socket Layer (or SSL) of the Internet.

17. The method according to claim 8 wherein the first storing is in a transportable medium for delivering to the site of the particular selected event to there be tendered as a digital ticket by the ticket consumer.

18. The method according to claim 8 wherein the first storing is in the transportable medium of a printed substrate;

wherein the printed encrypted digital record is subsequently physically delivered to the site of the particular selected event to there be tendered as the digital ticket by the ticket consumer.

19. The method according to claim 18 wherein the first storing in the transportable medium of a printed substrate is in form of a two-dimensional bar code.

20. The method according to claim 19 wherein the first storing in the transportable medium of a printed two-dimensional bar code is in accordance with the PDF417 standard.

21. The method according to claim 19 wherein the first storing in the transportable medium of a printed two-dimensional bar code is in accordance with the QR standard.

22. The method according to claim 8 wherein the first storing in the transportable medium of a computer disk.

23. The method according to claim 8 wherein the first storing is in the transportable medium of a smart card;

wherein the digital record stored within the smart card is physically delivered to the site of the particular selected event to there be tendered as the digital ticket by the ticket consumer.

24. A system for delivering a digital ticket upon a communications network comprising:

a ticket consumer's computer, connected to the communications network, the ticket consumer's computer comprising means for first transmitting ticket order data upon the communications network to a ticket provider's computer, means for first receiving upon the communications network from the ticket provider's computer a digitally signed ticket data, and means for storing the digitally signed ticket data in a transportable storage medium;

a ticket provider's computer, connected to the communications network, the ticket provider's computer comprising means for second receiving from the ticket consumer's computer upon the communications network the first-transmitted ticket order data, means for digitally signing the ticket data, and means for second transmitting the digitally signed ticket data upon the communications network to the ticket consumer's computer; and a communications network, the communications network comprising means for communicating at a first time the first-transmitting of the ticket consumer's computer to the second-receiving of the ticket provider's computer, and means for communicating at a second time the second-transmitting of the ticket provider's computer to the first-receiving of the ticket consumer's computer;

wherein the ticket consumer's computer further comprises means for first calculating a number R, and means for second calculating a one way function of R to produce hash (R) as ticket data, wherein the first transmitting is of the second-calculated hash (R) as the ticket data, wherein the first receiving is of hash (R) and additional information I digitally signed with signature key s as Sign (s, I∥hash (R)), wherein the ticket consumer's computer further comprises means for third calculating an appending of R to the digital ticket precursor Sign (s, I∥hash (R)), giving Sign (s, I∥hash (R))∥R as a digital ticket and wherein the storing is of the third-calculated digital ticket Sign (s, I∥hash (R))∥R;

wherein the second receiving comprises receiving the first-transmitted hash (R) ticket order data, wherein the ticket provider's computer further comprises means for calculating a digital signature in respect of the ticket data and additional information I, in respect of signature key s as Sign (s, I∥hash (R)), and wherein the second transmitting comprises transmitting the calculated Sign (s, I∥hash (R)).

25. The system for delivering a digital ticket according to claim 24
wherein the means for storing the digital ticket comprises means for printing the digital ticket.

26. The system for delivering a digital ticket according to claim 25
wherein the means for printing prints the digital ticket in a 2-D machine-readable pattern.

27. The system for delivering a digital ticket according to claim 26
wherein the 2-D machine-readable pattern comprises a 2-D machine-readable bar code pattern.

28. A system for delivering a digital ticket upon a communications network comprising:
a ticket consumer's computer, connected to the communications network, the ticket consumer's computer comprising means for first calculating a number R, means for second calculating a one way function of R to produce hash (R) as ticket data, means for first transmitting the second-calculated hash (R) ticket data upon the communications network to a ticket provider's computer as a ticket data for a particular selected event, means for first receiving upon the communications network a digitally signed data in respect of signature key s of hash (R) and additional information I as Sign (s, I∥hash (R)), means for third calculating an appending of R to the digital ticket precursor Sign (s, I∥hash (R)) so as to give Sign (s, I∥hash (R))∥R in a digital ticket, and means for first storing the third-calculated digital ticket Sign (s, I∥hash (R))∥R in a transportable storage medium;
a ticket provider's computer, connected to the communications network, the ticket provider's computer comprising means for second receiving from the ticket consumer's computer upon the communications network the first-transmitted hash (R) ticket data, means for fourth calculating digitally signed data in respect of signature key s of second-received hash R and of information I as Sign (s, I∥hash (R)), and means for second transmitting the fourth-calculated Sign (s, I hash (R)) upon the communications network to the ticket consumer's computer;
and a communications network, the communications network comprising means for communicating at a first time the first-transmitting of the ticket consumer's computer to the second-receiving of the ticket provider's computer, and means for communicating at a second time the fourth-transmitting of the ticket provider's computer to the first-receiving of the ticket consumer's computer.

29. A digital ticket procured by a ticket consumer upon a communication network from and by interaction with a ticket provider, the digital ticket comprising:
a tangible transportable data storage medium containing Sign (s, I∥hash (R))∥R where
(1) R is a number having its origin in a computer of the ticket consumer, which number R is appended to
(2) a number Sign (s, I∥hash (R)) that was computed in a computer of the ticket provider as a digitally signature signed data in respect of a signature key s of a number hash (R) appended to information I, thus Sign (s, I∥hash (R)), and subsequently communicated across the communications network to the computer of the ticket consumer, which number hash (R) was itself computed in the computer of the ticket consumer as a one way function of R, thus hash (R), and subsequently communicated to the computer of the ticket provider;
wherein number R, having its origin in a computer of the ticket consumer, is private to the ticket consumer and is not public, and
wherein the digital signature key s of the computer of the ticket provider is private to the ticket provider and is not public.

30. A digital ticket comprising:
a tangible transportable digital data storage medium containing
first-type data, originally known both to a buyer and to a seller of a ticket and meaningful to at least the seller of the ticket to identify, at least relatively, a particular event for which the ticket was sold, and
second-type data including a signed digital representation of a particular parameter that was originally computer-generated in a sequence first by the buyer of the ticket as a non-invertible function of a random number called a "first-time-made non-invertible function", wherein the non-invertible function is a one-way hash function, and wherein the random number is uniquely known to the buyer and not to the seller, and then
second by the seller of the ticket as a digital signature of the first-time-made non-invertible function, and then
third by the buyer of the ticket to attach the selfsame random number;
wherein, to validate the digital ticket upon attempted redemption of the ticket,
the random number is detached, and then
the signed first-time-made non-invertible function is interpreted, recovering this first-time-made non-invertible function, and then
the non-invertible function of that selfsame random number just detached is newly made all over again, which newly made non-invertible function is called the "second-time-made non-invertible function";
wherein the second-time-made non-invertible function EITHER equals the first-time-made non-invertible function IN WHICH CASE the ticket is not invalid OR ELSE the second-time-made non-invertible function does not equal the first-time-made non-invertible functional thus making the digital ticket is invalid for at least the particular event.

31. The digital ticket according to claim 30 wherein the digital signature within the tangible medium as read by a digital reader is further compared to a data base of digital tickets actually signed and sold not so as to determine whether a tendered digital ticket is valid or invalid but rather for statistical purposes.

32. The digital ticket according to claim 30 wherein the digital signature within the tangible medium is visible to the eye.

33. The digital ticket according to claim 30
wherein the digital signature visible to the eye is comparable by eye to a catalog of visual sensible representations of digital tickets actually signed and sold in order to determine whether a tendered digital ticket is valid or invalid.

34. A system for delivering a digital ticket from a ticket seller to a ticket buyer, the system comprising:
a communication channel comprising means for, at a first time, sending from a ticket seller to a ticket buyer data regarding events for which tickets may be had, means for, at a second time, sending from the ticket buyer to the ticket seller data representative of a non-invertible transformation of a number determined by the ticket buyer only, and means for, at a third time, sending from the ticket seller to the ticket buyer a digital signature of the non-invertible transformation, wherein the received digital signature of the non-invertible transformation is combined with the number to produce a digital ticket;
a ticket buyer's computer, communicatively connected to the communications channel, the ticket buyer's computer comprising means for determining the number, means for computing the non-invertible transformation, and means for combining the digital signature of the non-invertible transformation with the number to produce a digital ticket;
a ticket seller's computer, communicatively connected to the communications channel, the ticket seller's computer comprising means for computing, in respect of the non-invertible transformation received from the ticket buyer, the digital signature of the non-invertible transformation; and
a tangible portable medium of digital data storage connected to the buyer's computer and storing the digital ticket;
wherein the communication channel is sending at the second time a random number.

35. The system according to claim 34 wherein the communication channel is sending at the second time a number representing the particular selected event.

36. The system according to claim 34 wherein the communication channel comprises:
a worldwide digital communications network.

37. The system according to claim 34 wherein the communication channel comprises: a worldwide secure digital communications network.

38. The system according to claim 34 wherein the tangible portable medium of digital data storage comprises:
a computer disk.

39. The system according to claim 34 wherein the tangible portable medium of digital data storage comprises:
a printed medium.

40. A printed ticket bearing indicia CHARACTERIZED IN THAT the indicia includes a 2-D bar code containing a one-way function of a number provided by a holder of the ticket, the one-way function being digitally signed by a provider of the ticket;
FURTHER CHARACTERIZED IN THAT the 2-D bar coded indicia contains Sign (s, I∥hash (R))∥R where
(1) R is a number having its origin in a computer of a consumer of the ticket, which number R is appended to
(2) a number Sign (s I∥hash (R)) that was
computed in a computer of a Provider of the ticket as a digital signature in respect of digital signature key s of the number hash (R) in combination with information I,
subsequently communicated across the communications network to the computer of the ticket consumer, which number hash (R) was itself
computed in the computer of the ticket provider as a one way function of R and subsequently communicated to the computer of the ticket provider;
wherein number R, having its origin in a computer of the ticket consumer, is private to the ticket consumer and is not public; and
wherein the digital signature key s of the computer of the ticket provider is private to the ticket provider and is not public.

41. A communications system for selling and delivering a digital ticket comprising:
a ticket buyer computer (i) sending at a first time a one-way transformation of a private number to a seller computer, (ii) receiving at a third time signed information from the ticket seller computer, and (iii) storing at a fourth time within a digital store the received encrypted signed information plus the private number;
a ticket seller computer (i) receiving at the first time the one-way transformation of the private number from the seller computer, (ii) signing at a second time this one-way transformation and additional information, and (iii) sending at the third time the signed first transformation and additional information to the ticket buyer computer as signed information; and
a digital store storing at the fourth time the signed information plus the private number as a digital ticket;
wherein upon (i) a reading of the signed information, (ii) a decrypting of the signed information to recover the one-way transformation of the private number, (iii) a reproducing with the same secure first transformation that the ticket seller used the secure first transformation of the number all over again, and (iv) a comparing of the decrypted recovered one-way transformation to the reproduced first transformation, validity of the digital ticket is assessable;
wherein the second communicating is of second digital data $D_2$ including a one-way function hash (R) of a number R which number R is uniquely known to the computer of the ticket buyer and not to the computer of the ticket seller.

42. A method for selling and delivering a digital ticket comprising:
first-sending at a first time a one-way transformation of a private number from a ticket buyer computer to a ticket seller computer, wherein the private number is a random number; first-receiving at the first time the one-way transformation of the private number in the ticket seller computer;
signing at a second time the one-way transformation and additional information in the ticket seller computer;
second-sending at a third time the signed first transformation and additional information as signed information from the ticket seller computer to the ticket buyer computer;
second-receiving at the third time the signed information in the ticket buyer computer;
storing with the ticket buyer computer at a fourth time both (i) the received signed information plus (ii) the private number within a digital memory store;

storing within the digital memory store at the fourth time the signed information plus the private number as s digital ticket;

wherein upon (i) a reading of the signed information, (ii) a decrypting of the signed information to recover the one-way transformation of the private number, (iii) a reproducing, with the same secure first transformation that the ticket seller used, the secure first transformation of the number all over again, and (iii) a comparing of the decrypted recovered one-way transformation to the reproduced first transformation, validity of the digital ticket is assessable.

43. In a communications system having a computer of a ticket buyer bi-directionally communicating across an insecure digital communications network to the secure computer of a ticket seller, a method for selling and for delivering a digital ticket from a ticket seller to a ticket buyer, the method comprising:

at a first time first-sending from the computer of the ticket seller across the communications network to the computer of the ticket buyer first data regarding events for which tickets may be had; then at a second time second-sending from the computer of the ticket buyer across the communications network to the computer of the ticket seller second data identifying and event for which a ticket is desired, the second data accompanied by a secure first transformation of a number that is determined by the ticket buyer only and unknown to others including the ticket seller; then at a third time third-sending from the computer of the ticket seller across the communications network to the computer of the ticket buyer third data confirming ticketing to the event for which the ticket was desired, the third data accompanied by a secure second transformation of the secure first transformation; and then storing, with the computer of the ticket buyer within a tangible portable medium of digital data storage, (i) the number in accompaniment to (ii) the secure second transformation;

wherein upon (i) transportation of the digital data storage medium to a physical site of the event, (ii) reading of the number to a computer, and, by use of the same secure first transformation that the buyer did use, reproduction of the secure first transformation of the number all over again, plus (iii) reversing of the secure second transformation by an event computer privileged to knowledge of said second transformation, then a (ii) read and reproduced first transformation is comparable to a (iii) first transformation recovered from reversing the second transformation in order to assess validity of the digital ticket;

wherein the communication channel is sending at the second time a random number.

44. The method according to claim 43 wherein the second-sending is of the second data accompanied by a secure first transformation in the form of a one-way hash function of the number.

45. The method according to claim 43 wherein the third-sending is of the second data accompanied by a secure transformation in the form of a digital signature of the secure first transformation.

46. The method according to claim 43 wherein the storing within a tangible portable medium of digital data storage comprises:

printing.

47. The method according to claim 43 wherein the printing is of at least the (ii) secure second transformation in the form of a two-dimensional bar code.

* * * * *

UNITED STATES PATENT AND TRADEMARK OFFICE
CERTIFICATE OF CORRECTION

| | |
|---|---|
| PATENT NO. | : 7,093,130 B1 |
| APPLICATION NO. | : 09/490354 |
| DATED | : August 15, 2006 |
| INVENTOR(S) | : Kobayashi et al. |

It is certified that error appears in the above-identified patent and that said Letters Patent is hereby corrected as shown below:

Title Page; item (56)

In the Issued Patent:

Under References Cited, U.S. Patent Documents, before "5,629,980", please insert --5,557,518 A* 9/1996 Rosen--.

Under References Cited, U.S. Patent Documents, after "2002/0116616", please insert --2002/0095383 A1* 7/2002 Mengin et al.--.

Column 20, line 17, between "method" and "first" please insert the following: --system and ticket of the present invention are secure, and just how everything "comes together" to offer all the many benefits enumerated in section 1.

Consider things from this viewpoint: The computer of the ticket consumer is producing something -- the one-way function, or hash, of an (essentially) random number initially known only to itself -- that the ticket provider's computer cannot produce -- at least initially at a time before ticket redemption. The ticket provider's computer could produce this one-way hash function if only it had the random number, but initially it does not have this number.

The computer of the ticket producer, receiving across the network the one- way hash function from the consumer's computer where it was produced, proceeds to produce something -- a signed digital signature -- that the consumer's computer cannot produce. The consumer's computer might be able to do this signing procedure itself if it but had the secret signature key of the producer's computer; but it does not.

UNITED STATES PATENT AND TRADEMARK OFFICE
CERTIFICATE OF CORRECTION

| | |
|---|---|
| PATENT NO. | : 7,093,130 B1 |
| APPLICATION NO. | : 09/490354 |
| DATED | : August 15, 2006 |
| INVENTOR(S) | : Kobayashi et al. |

It is certified that error appears in the above-identified patent and that said Letters Patent is hereby corrected as shown below:

In the Issued Patent:

Note immediately that a party intercepting some, or all, communications traffic on the network concerning the digital ticket is still unable to determine either (i) the random number of the computer of the ticket consumer (R, in the preceding sections) or (ii) the signature key (s, in the preceding sections), of the ticket producer's computer.

The consumer's computer, receiving across the network from the producer's computer its own (previously transmitted) one-way hash function now signed, simply appends the original random number, and stores the composite away as the digital ticket.

When the ticket is redeemed then, for the first time ever, either the producer's computer or, more likely, a gate keeper's computer in privity of relationship with the producer's computer at least as regards how to decrypt the digital signature of the producer's computer, will immediately have access to -- for the--.

Column 24, line 19, please delete "$R_2 evenR$", and insert --$R_2 evenR_1$-- therefor.

UNITED STATES PATENT AND TRADEMARK OFFICE
CERTIFICATE OF CORRECTION

PATENT NO. : 7,093,130 B1
APPLICATION NO. : 09/490354
DATED : August 15, 2006
INVENTOR(S) : Kobayashi et al.

It is certified that error appears in the above-identified patent and that said Letters Patent is hereby corrected as shown below:

In the Issued Patent:

Column 25, line 63, delete "$\forall C : R_i$", and insert --$\ni C : R_i$-- therefor.

Column 35, line 57, after "fourth-calculated", please delete "Sign (s, I" and insert --Sign (s, I $\|$ -- therefor.

Signed and Sealed this

Eighth Day of April, 2008

JON W. DUDAS
*Director of the United States Patent and Trademark Office*